United States Patent
Cedilnik

(10) Patent No.: US 10,935,417 B2
(45) Date of Patent: Mar. 2, 2021

(54) DISTRIBUTED ACOUSTIC SENSING SYSTEM USING DIFFERENT COHERENT INTERROGATING LIGHT PATTERNS AND CORRESPONDING SENSING METHOD

(71) Applicant: AiQ Dienstleistungen UG (haftungsbeschränkt), Böblingen (DE)

(72) Inventor: Gregor Cedilnik, Gäufelden (DE)

(73) Assignee: AiQ Dienstleistungen UG (haftungsbeschränkt), Böblingen (DE)

( * ) Notice: Subject to any disclaimer, the term of this patent is extended or adjusted under 35 U.S.C. 154(b) by 163 days.

(21) Appl. No.: 16/167,390

(22) Filed: Oct. 22, 2018

(65) Prior Publication Data
US 2019/0128731 A1    May 2, 2019

(30) Foreign Application Priority Data
Oct. 26, 2017   (EP) .................................... 17198713

(51) Int. Cl.
*G01H 9/00* (2006.01)
*G01D 5/353* (2006.01)
*E21B 47/135* (2012.01)

(52) U.S. Cl.
CPC ........... *G01H 9/004* (2013.01); *E21B 47/135* (2020.05); *G01D 5/35361* (2013.01)

(58) Field of Classification Search
CPC ........ G01H 9/004; G01K 11/32; G01D 5/353; G01D 5/35361
See application file for complete search history.

(56) References Cited

U.S. PATENT DOCUMENTS

| | | | | |
|---|---|---|---|---|
| 5,095,487 A | * | 3/1992 | Meyerhofer | ......... H01S 3/0057 372/102 |
| 5,194,847 A | * | 3/1993 | Taylor | .................... G01H 9/004 340/541 |

(Continued)

FOREIGN PATENT DOCUMENTS

| GB | 2 482 641 A | 2/2012 |
|---|---|---|
| GB | 2 515 564 A | 12/2014 |

(Continued)

OTHER PUBLICATIONS

European Patent Office, Extended European Search Report, dated Mar. 22, 2019, 8 pages; EPO, Munich, Germany.

*Primary Examiner* — Helen C Kwok
(74) *Attorney, Agent, or Firm* — Robert A. Blaha; Smith Tempel Blaha LLC

(57) ABSTRACT

A distributed acoustic sensing (DAS) system has a coherent light source device that repeatedly sends a coherent interrogating light pattern (CILP) into an optical sensing fiber during a measurement duration that is equal to or greater than a down-up travel time of the optical sensing fiber. The CILP is one of a plurality of patterns composed of coherent carrier light. A detection device detects backscattered light in the optical sensing fiber in response to the CILP and generates a signal indicative of the detected backscattered light. An evaluation device analyses the signal. Each CILP has similar physical properties that render the light patterns indistinguishable by comparing physical properties of the backscattered light responsive to at least two successive interrogating light patterns as detected. The coherent light source device can change the time between successively sent interrogating light patterns after the passing of at least one measurement time duration.

12 Claims, 4 Drawing Sheets

(56) References Cited

U.S. PATENT DOCUMENTS

| | | | |
|---|---|---|---|
| 7,742,157 B2* | 6/2010 | Lewis | G01M 11/3172 356/73.1 |
| 7,859,654 B2 | 12/2010 | Hartog | |
| 7,873,273 B2* | 1/2011 | Koyamada | G01M 11/319 250/227.14 |
| 9,170,149 B2 | 10/2015 | Hartog et al. | |
| 2006/0210269 A1* | 9/2006 | Farhadiroushan | G01K 11/32 398/48 |
| 2008/0277568 A1* | 11/2008 | Crickmore | G08G 1/02 250/227.12 |
| 2009/0008536 A1* | 1/2009 | Hartog | G01J 3/4412 250/227.14 |
| 2010/0014071 A1 | 1/2010 | Hartog | |
| 2010/0321702 A1* | 12/2010 | Froggatt | G01M 11/083 356/450 |
| 2012/0067118 A1 | 3/2012 | Hartog et al. | |
| 2012/0176606 A1 | 7/2012 | Zadorozhny et al. | |
| 2012/0226452 A1* | 9/2012 | Hill | G01S 5/22 702/56 |
| 2012/0230628 A1* | 9/2012 | Hill | G01D 5/353 385/12 |
| 2012/0280117 A1* | 11/2012 | Lewis | G01D 5/35367 250/227.17 |
| 2013/0222811 A1* | 8/2013 | Handerek | G01M 11/3127 356/477 |
| 2015/0036147 A1* | 2/2015 | Xiao | G01D 5/35312 356/480 |
| 2016/0258808 A1* | 9/2016 | Cedilnik | G01B 11/16 |
| 2016/0341841 A1 | 11/2016 | Barfoot et al. | |
| 2018/0013387 A1* | 1/2018 | Fells | G01D 5/353 |
| 2019/0219441 A1* | 7/2019 | Cedilnik | G01D 5/35361 |
| 2020/0116556 A1* | 4/2020 | Cedilnik | G01H 9/004 |

FOREIGN PATENT DOCUMENTS

| | | |
|---|---|---|
| WO | WO 2011/058322 A2 | 5/2011 |
| WO | WO 2012/137021 A2 | 10/2012 |
| WO | WO 2015/170114 A1 | 11/2015 |
| WO | WO 2016/117044 A1 | 7/2016 |
| WO | WO 2017/037453 A1 | 3/2017 |
| WO | WO 2017/069724 A1 | 4/2017 |
| WO | WO 2017/127212 A1 | 7/2017 |

* cited by examiner

DISTRIBUTED ACOUSTIC SENSING SYSTEM USING DIFFERENT COHERENT INTERROGATING LIGHT PATTERNS AND CORRESPONDING SENSING METHOD

TECHNICAL FIELD

The invention relates to a distributed acoustic sensing system using a coherent interrogating light pattern, and a corresponding sensing method. In particular, the present invention aims to overcome a systematic limitation that is known from conventional DAS devices and methods, and relates to the relationship between optical sensing fiber length and the maximum detectable bandwidth of an acoustic event affecting the fiber.

TECHNOLOGICAL BACKGROUND

Distributed acoustic sensing (DAS) systems make use of an optical fiber, as may be present in a fiber optic cable, to provide distributed strain sensing based on measuring backscattered light and evaluating this for the occurrence of indications of periodic (acoustic) strain events acting on the optical fiber in a particular length interval of the optical fiber. In DAS, the optical fiber becomes a sensing element, and measurements are made, and in part processed, using an attached optoelectronic device. A DAS system allows acoustic frequency strain signals to be detected over large distances and in harsh environments.

A DAS measurement system sends single pulses (as in U.S. Pat. No. 5,194,847, US 2012/0067118 A1, US 2012/0176606 A1, and WO 2016/117044 A1) or pulse pairs (as in WO 2015/170114 A1, and WO 2012/137021 A2) or pulse codes (as in WO 2017/069724 A1, GB 2 515 564 A, WO 2017/037453 A1), generally a light pattern of a very narrowband, highly coherent laser light into the sensing fiber and measures the intensity of the backscattered light (so-called "intensity DAS" systems) and/or extracts the phase of the backscattered light signal (so-called "phase DAS" systems). Backscattered light can be the elastic Rayleigh scattering propagating in opposite direction to the pulse within the sensing fiber, but in general from any kind of interaction of the sent light pattern with the sensing fiber that creates light propagating back in the fiber.

Phase analysis, for example by interfering backscattered light with coherent light coupled-out from the laser acting as a "local oscillator", is disclosed in US 2012/0067118 A1. In another example of phase analysis, backscattered light is interfered with a copy of the backscatter, which is shifted in time by a delay line, using an interferometer on the receiver side, as disclosed in GB 2 482 641 A. In still another example, the phase analysis involves the interference between the backscatter of the pulses of a pulse pair. The local oscillator may have a different frequency than the signal, which then requires employing some heterodyne technique to derive the phase, as in US 2012/0067118 A1.

US 2012/0067118 A1 discloses a distributed fiber optic sensor system having improved linearity. The system comprises an optical source to output a first optical signal to launch into an optical fiber, and a coherent detector to mix a coherent Rayleigh backscatter signal generated by the optical fiber in response to the first optical signal with a second optical signal output by the optical source and to generate a mixed output signal. A phase detection and acquisition system determines a phase difference between first and second locations along the optical fiber based on phase information extracted from the mixed output signal and combines the phase information extracted from multiple acquisitions to detect strain on the optical fiber sensor.

Basic arrangements of DAS systems are illustrated by way of example in FIG. 1, which illustrates an intensity DAS system, and FIG. 2, which illustrates a phase DAS system. These systems, in adaptations for implementing the present invention, are described in detail below.

FIG. 3 illustrates in an exemplary simplified manner the measurement principle of DAS. In its upper portion, FIG. 3 shows a profile 300 of interrogating light in the form of a light pulse 307 that has been launched into an optical sensing fiber 110. The profile 300 is drawn with respect to an x-axis 302, which extends horizontally in the upper portion of FIG. 3 and depicts a scale for the distance x measured along the fiber 110, and a y-axis 304, which extends vertically in the upper portion of FIG. 3 and depicts a scale for the light intensity I measured along the fiber 110. A so-called "trace" 306 of the intensity I of interrogating light shows a light pulse 307 as an embodiment of a coherent interrogating light pattern. This light pulse 307 is passing by an acoustic event 308, which affects the optical sensing fiber 110 in a specific length interval of the fiber 110 at a distance of, for example, 15 km from the position, where the interrogating light pulse has been launched into the optical sensing fiber 110. Further by way of example, FIG. 3 shows an optical sensor fiber 110 having a length of 50 km and carrying interrogating light in the form of light pulses, such as light pulse 307, which are launched into the fiber 110 at a pulse rate of 2 kHz, which corresponds to time period between successively launched light pulses of 0.5 µs.

A coherent interrogating light pattern, such as the light pulse 307, propagates in the optical sensing fiber 110 at a speed, which is given by $c_0/n_{fiber}$, where $c_0$ is the speed of light in vacuum ($c_0$=2.99792×10$^8$ m/s) and $n_{fiber}$ is the refractive index of the optical fiber 110 (e.g. $n_{fiber}$=1.4682). Accordingly, the speed by which light is propagating in the optical fiber 110 is 2.0419×10$^8$ m/s, or approximately 2×10$^8$ m/s. A time required for a light pattern, such as the light pulse 307, to propagate along the total fiber length of e.g. L=50 km is approximately 0.25 ms. Accordingly, a time for an interrogating light pattern to travel down the total fiber length (L=50 km) and for backscattered light to travel up the fiber length, the so-called down-and-up travel time $t_{u-d}$, which is associated to the fiber length of e.g. 50 km, amounts to 0.5 ms.

Conventionally, DAS measurement systems wait for the interrogating light pattern, such as the light pulse 307, to propagate from the launch position along the entire fiber length down to the fiber end and for backscattered light to travel back up the whole fiber length to the launch position, before a next interrogating light pattern is launched into the fiber. This ensures that at any time there is at maximum one interrogating light pattern in the optical sensing fiber 110, as shown in FIG. 3. In result, an acoustic event 308 acting on the fiber 110 can be unambiguously assigned to a fiber location by measuring the time required for the interrogating light pattern to travel from the launch position down to the acoustic event 308 and for light that is backscattered from the acoustic event 308 to travel from the acoustic event 308 up to the launch position, i.e. by a so-called time-of-flight measurement.

If at any time maximally one interrogating light pattern, such as the light pulse 307, or its backscatter, propagates in the optical sensing fiber 110, a strain event occurring at any position along the fiber 110, such as the acoustic event 308 at fiber position x=15 km, can be unambiguously located by a time-of-flight measurement.

The useable length of an optical sensing fiber 110 is finite. If the length of a fiber exceeds a range $L_{max}$ from which a relevant, i.e. measurable portion of backscatter reaches back to the receiver so that it has a noticeable impact on a light detector (such as the light detector 114 in FIG. 1), such as to produce a measurable signal output from the light detector, the pulse rate may be adjusted to such shorter length $L_{max}$.

Conventional DAS systems, such as the one described hereinbefore and operating as illustrated in FIG. 3, are believed to have the following limitations.

The maximum rate, at which an interrogating light pattern can be launched into an optical sensing fiber, or the minimum time period between successively sent interrogating light patterns, depends on the fiber length L: The longer the optical sensing fiber 110, the longer the time period from a sent interrogating light pattern to a next interrogating light pattern must be set. For example, as explained above with reference to FIG. 3, an optical sensing fiber 110 having a length L of, for example, 50 km allows a rate of successively sending interrogating light patterns of at maximum approximately 2 kHz.

The bandwidth for detecting acoustic events, such as acoustic event 307 in FIG. 3, on an optical sensing fiber 110, is limited by the acoustic sample rate, in this case by the repetition rate for successively sending interrogating light patterns, as described by the known Nyquist criterion. In signal processing, the known Nyquist sampling theorem states that a bandlimited signal, which is bandlimited to a frequency $f_{max}$, may be reconstructed exactly from a sequence of equidistant sampling values, if the signal is sampled with a sampling frequency greater than $2 \times f_{max}$ (Nyquist frequency). In other words, the Nyquist criterion says that a signal must be sampled at least twice as often as its highest frequency to enable correct reconstruction of the signal. Conversely, if a sampling frequency for equidistantly sampling a signal that is varying in time can be adjusted to a maximum value $f_{sample}$, signal components having signal frequencies of up to $\frac{1}{2} \times f_{sample}$ can be correctly, i.e. unambiguously reconstructed without under- or oversampling.

For the example described with reference to FIG. 3, the maximum sending rate $(1/t_{u-d})$ of approximately 2 kHz, which allows for unambiguously locating a strain event by a time-of-flight measurement in an optical sensing fiber 110 having a length of 50 km, in application of the Nyquist criterion, allows an unambiguous detection of frequencies of up to 1 kHz or an unambiguous determination of acoustic bands having frequencies up to 1 kHz.

Components in an acoustic band having higher frequencies than the Nyquist frequency appear shifted, which is sometimes also called "mirrored", into the unambiguous range below the Nyquist frequency, as is illustrated in FIG. 4.

FIG. 4 shows a signal diagram 400 of a periodical (here a sinusoidal) signal 406, which is to be sampled. The signal diagram 400 is drawn with respect to an x-axis 402, which extends horizontally in FIG. 4 and depicts a scale for the time t, and a y-axis 404, which extends vertically in FIG. 4 and depicts a scale for the signal strength S. A trace of the signal 406 to be sampled is shown as a continuous line in FIG. 4. Along the trace of the signal 406 to be sampled, a plurality of sampling points 408, at which the signal 406 is sampled and which are indicated as black bullets in FIG. 4, is shown. On the basis of the set of values of the signal 406 obtained by sampling the signal 406 at the sampling points 408, a reconstructed signal 410, which is represented by the dotted line in FIG. 4, is reconstructed. It can be seen in FIG. 4 that the frequency of the reconstructed signal 410 appears to be lower than the frequency of the signal 406 to be sampled. This can be understood to be due to the too low sampling rate provided by the set of sampling points 408.

In summary of the above considerations, the conventional criterion for unambiguously locating strain events in an optical sensing fiber 110, i.e. increasing the time period between successively sent interrogating light patterns to be greater than the down-and-up travel time $t_{u-d}$ for the light in the fiber, or accordingly lowering the frequency $(1/t_{u-d})$ of sending interrogating light patterns, in application of the Nyquist criterion, imposes a limitation on the frequency bandwidth of an acoustic band $(1/t_{u-d}=2 \times f_{max})$ that can be detected.

This is a severe limitation in applications, in which higher frequencies, such as for example ultra-sonic signals, shall be detected and identified (refer to the corresponding remark below) over a long optical sensing fiber.

Conventionally, this limitation is overcome by a multi-frequency or multi-wavelength method, a multi-polarization method, or a multi-code method. In these methods, pulses and their backscatter are "labeled" with different parameters of the sent interrogating light, namely the frequency or wavelength of the sent light, the polarization of the sent light, or a code pattern of the sent interrogating light. Interrogating light patterns, which are labeled by a same parameter shall be said to constitute a "family" of interrogating light patterns.

In these known labeling methods, interrogating light patterns from different families propagate simultaneously in the fiber. On the receiver side, the backscatter from different families can be separated by suitable means, such as an optical filter in the case of multi-frequency or multi-wavelength method, or a polarization analyzer in the case of multi-polarization method, so that each family constitutes a kind of independent (or separate) DAS instrument. The interrogating light patterns of each family must meet the described bandwidth limitation, but running the different families in a suitable sequence and combining their results can yield an increased acoustic bandwidth $N \times f_{Ny}$, where N is the number of families, and $f_{Ny}$ the Nyquist limit frequency of each family.

However, such a labeling method requires additional complexity with respect to architecture and components, especially for example the cost for integrating multiple very narrow-line lasers (in a multi-wavelength method), or multiple laser-frequency shifter elements or frequency shifter loop and gating arrangements, as is disclosed for example in US 2012/0067118 A1, as well as multiple detectors or detectors with higher bandwidth, digitized with higher bandwidths and sampling rates, both significantly increasing the data rate and the required processing speed.

In the applications, in which higher frequencies, such as ultra-sonic signals, are to be detected and identified, the term "identify" or "identification" means that the real frequency of a signal (not the signal with the frequency shifted by under-sampling) can be determined. Without a multi-label method, frequencies f beyond the Nyquist frequency $f_{Ny}$ may still be detected, but due to the sampling theorem shifted in frequency into the Nyquist band. Therefore the real frequency of the acoustic event—or generally the acoustic spectrum of the acoustic event—cannot be extracted from the measured data, if the acoustic spectrum contains frequency components having frequencies beyond the Nyquist limit. As an example: an acoustic event having a frequency component of 2.6 kHz will appear as 0.6 kHz when a sending rate of 2 kHz is implemented.

As an example implementation of a multi-frequency labeling method, US 2010/014071 A1 discloses a system and method for launching a plurality of interrogating pulses into the optical fiber, wherein at least a first interrogating pulse has a first optical carrier frequency and a second interrogating pulse has a second optical carrier frequency, which is different than the first optical carrier frequency. The method further comprises acquiring, for each of the plurality of interrogating pulses, a Rayleigh backscatter signal as a function of time, and, based on the detecting, determining a distribution of a first physical parameter along a length of the optical fiber.

WO 2012/137021 A2 teaches to launch a plurality of probe pulses into an optical fibre, whereas the probe pulses have to have different physical properties in order to correlate the pulses sent into the fibre with its backscatter. WO 2017/037453 A1 discloses an optical generator for repeatedly generating a first coded sequence of optical radiation to be launched into an optical sensing fibre. The first coded sequence is encoded according to a polylevel coding sequence. In another implementation of a labeling method as disclosed in GB 2 515 564 A, the pulses of a pulse pair have a mutual frequency difference.

Still another implementation of a labeling method is disclosed in WO 2017/069724 A1, where a distributed acoustic sensing method includes sending a sequence of optical pulses along an optical sensing fiber, wherein the optical pulses have at least two different pulse widths, and demodulating backscattered light from the optical sensing fiber to obtain interferometric phase measurements as a function of position.

In the above-referenced prior art, the DAS measurement systems wait for the interrogating light pattern to propagate to the end of the optical sensing fiber end and for the backscatter to propagate back to the launching position, before sending a next interrogating light pattern into the fiber. By this measure, the location of an acoustic event acting on the sensing fiber can be unambiguously assigned to a fiber location by a time-of-flight determination, as has been explained with reference to FIG. 3.

It is noted that in the present disclosure, the illustrations (graphs) and the terminology refer to the location of the interrogating light pattern, e.g. a pulse location, in the optical sensing fiber, where the interrogating light pattern meets the acoustic/strain event and the backscatter reaches the receiver at a given time, and where though (a portion of) the interrogating light actually propagates further down the sensing fiber during the back propagation time.

SUMMARY

It is an object of the present invention to provide a distributed acoustic sensing (DAS) system and a DAS method, in which the conventionally assumed limiting relationship between the length of the optical sensing fiber and the maximum detectable bandwidth of an acoustic/strain event acting on the optical sensing fiber can be overcome or reduced. In other words, an object of the present invention can be said to overcome or at least reduce the "fiber length⇔acoustic bandwidth limitation". Further objects include in particular to provide a DAS system and method, which allow frequency detection and identification of the frequency or frequency range, or generally the frequency spectrum of an acoustic/strain event over a bandwidth that is higher than given by the Nyquist limit (per label family, if applicable), and to avoid or at least reduce the additional complexity and need for components that would be needed in a labeling approach.

The object is solved by the subjects having the features according to the independent patent claims. Further embodiment examples are shown in the dependent claims.

According to an example embodiment there is established a distributed acoustic sensing (DAS) system, which is for coupling with an optical sensing fiber, which has a selectable fiber length and a down-and-up travel time for an interrogating light, for example a light pulse, to travel down the fiber length and for backscattered light to travel up the fiber length, the down-and-up travel time being associated to the fiber length. The distributed acoustic sensing system has:

a coherent light source device configured to repeatedly generate and send into an optical sensing fiber a coherent interrogating light pattern, which is out of a plurality of coherent interrogating light patterns and composed of coherent carrier light, during a measurement time duration, which is equal to or greater than one times the down-and-up travel time of the optical sensing fiber;

a detection device configured to detect over time light that is backscattered in the optical sensing fiber in response to the repeatedly sent coherent interrogating light patterns and to generate and output a signal that is indicative of the detected backscattered light;

an evaluation device configured to analyze the signal output from the detection device, wherein each coherent interrogating light pattern out of the plurality of coherent interrogating light patterns has similar physical properties, wherein the similarity is in the sense that the light patterns cannot be distinguished on the basis of comparing the physical properties of the backscattered light generated from at least two successive interrogating light patterns as such, and wherein the coherent light source device is capable to change the time period between (or the sending frequency or repetition frequency of) successively sent coherent interrogating light patterns after the passing of at least one measurement time duration (or in other words: the time period between the successively sending of coherent interrogating light patterns is changed over time, in one or more steps, respectively after the passing of at least one measurement time period).

Changing the time period between, or in other words the sending frequency or repetition frequency of, successively sent coherent interrogating light patterns enables novel approaches to determine the frequency or frequency band of an acoustic/strain event and its location along the optical sensing fiber unambiguously even beyond the conventionally known "fiber length⇔acoustic bandwidth limitation", in particular to determine the frequency or frequency band of the acoustic/strain event even for frequencies (or bandwidths for detecting acoustic events on the fiber) above the acoustic sample rate given by the Nyquist frequency, which may conventionally be limited by the fiber length due to the requirement to adjust the time period to be greater than the up-and-down travel time associated to the fiber length, so as to have only one interrogating light pattern in the optical sensing fiber at a time.

Technical advantages achieved by the changing of the time period between successively sent coherent interrogating light patterns over time and the thereby enabled novel approaches to determine the frequency or frequency band of an acoustic/strain event and its location along the optical sensing fiber unambiguously even beyond the conventionally known "fiber length⇔acoustic bandwidth limitation"

comprise the avoiding or at least reducing of the additional technical complexity and need for components, which are otherwise necessary in the conventional approaches for overcoming the "fiber length⇔acoustic bandwidth limitation", which approaches involve optical multi-frequency (or multi-wavelength) methods, multi-polarization methods, or multi-code methods, and are known in the art as labeling methods, i.e. methods for labeling coherent interrogating light patterns.

Overview of Embodiments

In a particular example of the distributed acoustic sensing system, the time period between successively sent coherent interrogating light patterns may be set to a first time period during a first measurement time duration and may be set to a second time period, which is different from the first time period, during a second measurement time duration. Example embodiments perform DAS measurements using at least two different time periods, each time period for at least a duration corresponding to two times the down-and-up travel time for the interrogating light.

In an example embodiment of the distributed acoustic sensing system, each coherent interrogating light pattern out of a plurality of coherent interrogating light patterns, which are send into the fiber during a, e.g. first and second, measurement time duration, may have substantially a same set of physical properties, wherein a set comprises at least
  a frequency (or wavelength) of the carrier light,
  an amplitude envelope modulation function, for example a pulse shape, a double pulse shape, or a pulse-based code pattern, and
  a polarization state of the carrier light.

In aforementioned embodiments of the distributed acoustic sensing system, the set of physical properties may exclude a mere scaling factor (or intensity) of the amplitude envelope modulation function, for example a scaling factor of a light pulse (or a pulse height).

In aforementioned embodiments of the distributed acoustic sensing system, furthermore, coherent interrogating light patterns out of the plurality of coherent interrogating light patterns may differ from each other in terms of light intensity and/or in terms of a polylevel coding sequence.

A plurality of coherent interrogating light patterns, which are sent into the fiber during a, e.g. first and second, measurement time period, may herein also be referred to briefly as "a family of coherent interrogating light patterns".

In an example embodiment of the distributed acoustic sensing system, the evaluation device may be configured to extract, for at least one sensing portion preferably all sensing portions, of the optical sensing fiber, changes between the signal outputs from the detection device that result from at least two successive ones of the coherent interrogating light pattern and corresponding to a same sensing portion of (or acoustic/strain event acting on) the optical sensing fiber.

Changing the time period between successively sent coherent interrogating light patterns enables at least a first and a second novel approach to determine the frequency or frequency band of an acoustic/strain event and its location along the optical sensing fiber unambiguously. The first and the second novel approach can also be combined in the sense that they are implemented successively in the distributed acoustic sensing system.

In a first advantageous embodiment of the distributed acoustic sensing system, according to a first novel approach, the following operating condition may be met: the time period is equal to or greater than the down-and-up travel time of the optical sensing fiber. In result of the first novel approach, there is at maximum one coherent interrogating light pattern present within the optical sensing fiber at any time.

In the particular embodiment of the distributed acoustic sensing system mentioned above, according to the first novel approach, the first and the second time periods may be equal to or greater than the down-and-up travel time of the optical sensing fiber. In result of this embodiment of the first novel approach, there is at maximum one coherent interrogating light pattern present within the optical sensing fiber at least during the first measurement time duration and during the second measurement time duration.

In an example embodiment of the distributed acoustic sensing system, the first and the second time period may be greater than 130%, preferably less or equal than 130%, more preferably less or equal than 120%, and still more preferably less or equal than 110%, of the down-and-up travel time of the optical sensing fiber.

In an example embodiment of the distributed acoustic sensing system, an inverse of the first time period may correspond to a first pulse repetition frequency present during the first measurement time duration and an inverse of the second time period may correspond to a second pulse repetition frequency present during the second measurement time duration. Herein, the half of the first pulse repetition frequency $f_{pulse,\ 1}$ may correspond to a first Nyquist frequency $f_{Ny,\ 1}$, i.e. $\frac{1}{2}f_{pulse,\ 1}=f_{Ny,\ 1}$, which corresponds to the largest bandwidth of an acoustic event which can be unambiguously determined when the first pulse repetition frequency $f_{pulse,\ 1}$ applies to the repeated sending of the coherent interrogating light pattern during the first measurement time duration. Herein further, the half of the second pulse repetition frequency $f_{pulse,\ 2}$ may correspond to a second Nyquist frequency $f_{Ny,\ 2}$ (i.e. $\frac{1}{2}f_{pulse,\ 2}=f_{Ny,\ 2}$), which corresponds to the largest bandwidth of an acoustic event which can be unambiguously determined when the second pulse repetition frequency $f_{pulse,\ 2}$ applies to the repeated sending of the coherent interrogating light pattern during the second measurement time duration.

In the aforementioned example, for an acoustic event having an actual frequency or bandwidth $f_{event}$ greater than the Nyquist frequency $f_{Ny}$, the actual frequency or bandwidth may be mapped to an apparent frequency $f_{apparent}$ that is smaller than the Nyquist frequency $f_{Ny}$ according to:

$$f_{apparent}=\text{abs}\ \{(f_{event}+f_{Ny})\bmod f_{pulse}-f_{Ny}\} \quad (\text{Eq. 1})$$

or $$f_{apparent}=\text{abs}\ \{(f_{event}+\tfrac{1}{2}f_{pulse})\bmod f_{pulse}-\tfrac{1}{2}f_{pulse}\} \quad (\text{Eq. 2})$$

In the aforementioned example, furthermore, the evaluation device may be configured
  to calculate for an acoustic event, which is detected in measurements performed using interrogating light patterns sent during the first measurement time duration using the first pulse repetition frequency $f_{pulse,\ 1}$, and which has a detected first apparent frequency $f_{apparent,\ 1}$, a first set of possible actual frequencies $f_{event,\ 1}$ greater than the first Nyquist frequency $f_{Ny,\ 1}$,
  to calculate for an acoustic event, which is detected in measurements performed using interrogating light patterns sent during the second measurement time duration using the second pulse repetition frequency $f_{pulse,\ 2}$ and which has a detected second apparent frequency $f_{apparent,\ 2}$ a second set of possible actual frequencies $f_{event,\ 2}$ greater than the second Nyquist frequency $f_{Ny,\ 2}$, and to determine, if in the first set and in the second set, there are one or more common frequency or bandwidth values, which are greater than the first and second Nyquist frequencies, respectively.

In an example embodiment of the distributed acoustic sensing system, the evaluation device may further be configured to output the one or more common frequency or bandwidth values as a possible actual frequency or bandwidth of an acoustic event.

Technical advantages achieved by the first advantageous embodiment example of the distributed acoustic sensing system include that the distributed acoustic sensing system has the capability, in addition to uniquely detecting the location along the fiber of an acoustic events acting on the fiber, to resolving or generally reducing an ambiguity from the possibly detected multiple acoustic frequencies. This ambiguity may be reduced further by sending, during a third measurement time duration, coherent interrogating light patterns spaced in time by a third time period or with a third pulse rate (or, during even further measurement time durations, light patterns spaced by even further time periods or with further pulse rates).

In a second advantageous example embodiment of the distributed acoustic sensing system, according to a second novel approach, the following operating condition may be met: the time period is smaller than one half of the down-and-up travel time of the optical sensing fiber. In result of the second novel approach, there is more than one coherent interrogating light pattern present within the optical sensing fiber at any time.

In the particular example embodiment of the distributed acoustic sensing system mentioned above, according to this second novel approach, the first and the second time periods are smaller than one half of the down-and-up travel time of the optical sensing fiber. In result of this second novel approach, a first number, which is greater than one, of coherent interrogating light patterns may be present within the optical sensing fiber at any time during the first measurement time duration, and a second number, which is greater than one and different from the first number, of coherent interrogating light patterns may be present within the optical sensing fiber at any time during the second measurement time duration.

In an example embodiment of the distributed acoustic sensing system using this second approach, the first and the second time periods may be smaller than one third (33%), preferably smaller than one fifth (20%), more preferably smaller than 16%, more preferably smaller than 12%, more preferably smaller than 10%, more preferably smaller than 5%, of the down-and-up travel time of the optical sensing fiber.

In addition, the evaluation device may be configured to detect, during the first measurement time duration, a first set of detected apparent acoustic events, which apparently occur at first-set fiber sensing portions, the positions of which are related by a first ambiguity corresponding to the first number of coherent interrogating light patterns being present in the optical sensing fiber, to detect, during the second measurement time duration, a second set of detected apparent acoustic events, which apparently occur at second-set fiber sensing portions, the positions of which are related by a second ambiguity corresponding to the second number of coherent interrogating light patterns being present in the optical sensing fiber, and to determine whether one of the first-set fiber sensing portions out of the first set of detected apparent acoustic events corresponds to one of the second-set fiber sensing portions out of the second set of detected apparent acoustic events.

In an example embodiment of the distributed acoustic sensing system using this second approach, the evaluation device may further be configured, if one of the first-set fiber sensing portions out of the first set of detected apparent acoustic events corresponds to one of the second-set fiber sensing portions out of the second set of detected apparent acoustic events, to resolve the first and the second ambiguity by determining the corresponding fiber sensing portion as the fiber sensing portion related to a detected same apparent acoustic event, which caused the a first and second sets of detected acoustic events.

Technical advantages achieved by a distributed acoustic sensing system with the second advantageous approach include that the distributed acoustic sensing system has the capability, in addition to uniquely determining the acoustic frequency (or acoustic bandwidth) of an acoustic events acting on the fiber, to resolving or generally reducing an ambiguity from the possibly detected multiple locations. This location ambiguity may be reduced further by sending, during a third measurement time duration, coherent interrogating light patterns spaced in time by a third time period or with a third pulse rate (or, during even further measurement time durations, light patterns spaced by even further time periods or with further pulse rates).

These example embodiments of the distributed acoustic sensing system according to the first novel approach and according to the second novel approach can also be combined in the sense that the operating conditions according to the first novel approach and the operating conditions according to the second novel approach are implemented successively in the distributed acoustic sensing system. The successive implementation may be performed in the stated sequence or in an inverse sequence.

According to a further example embodiment there is established a distributed acoustic sensing method for performing using a distributed acoustic sensing system for coupling with an optical sensing fiber, which has a selectable fiber length and a down-and-up travel time for an interrogating light, e.g. a light pulse, to travel down the fiber length and for backscattered light to travel up the fiber length, the down-and-up travel time being associated to the fiber length. The distributed acoustic sensing method having the following steps:

(a) repeatedly generating, e.g. using a coherent light source, and sending into an optical sensing fiber a coherent interrogating light pattern, which is out of a plurality of coherent interrogating light patterns and composed of coherent carrier light, during a measurement time duration, which is equal to or greater than one times the down-and-up travel time of the optical sensing fiber;

(b) detecting over time, e.g. using a detection device, light that is backscattered in the optical sensing fiber in response to the repeatedly sent coherent interrogating light patterns, and generating and outputting a signal that is indicative of detected backscattered light;

(c) analyzing the signal produced from backscattered light;

wherein in step a), coherent interrogating light patterns out of the plurality of coherent interrogating light patterns has similar physical properties, wherein the similarity is in the sense that the light patterns cannot be distinguished on the basis of comparing the physical properties of the backscattered light generated from at least two successive interrogating light patterns as such, and wherein in step (a), the time period between successively sent coherent interrogating light patterns is changed after the passing of at least one measurement time duration (or in other words: the time period between the successively sending of coherent interrogating light patterns is changed over time, in one or more steps, respectively after the passing of at least one measurement time period).

As already stated above, changing the time period between, or in other words the sending frequency or repetition frequency of, successively sent coherent interrogating light patterns enables novel approaches to determine the frequency or frequency band of an acoustic/strain event and its location along the optical sensing fiber unambiguously even beyond the conventionally known "fiber length⇔acoustic bandwidth limitation", in particular to determine the frequency or frequency band of the acoustic/strain event even when for frequencies above the Nyquist frequency, which may conventionally be limited by the fiber length due to the requirement to adjust the time period to be greater than the up-and-down travel time associated to the fiber length so as to have only one interrogating light pattern in the optical sensing fiber at a time.

Technical advantages achieved by the changing of the time period between successively sent coherent interrogating light patterns over time and the thereby enabled novel approaches to determine the frequency or frequency band of an acoustic/strain event and its location along the optical sensing fiber unambiguously even beyond the conventionally known "fiber length⇔acoustic bandwidth limitation" comprise the avoiding or at least reducing of the additional technical complexity and need for components, which are otherwise necessary in the conventional approaches for overcoming the "fiber length⇔acoustic bandwidth limitation", which approaches involve optical multi-frequency (or multi-wavelength) methods, multi-polarization methods, or multi-code methods, and are known in the art as labeling methods, i.e. methods for labeling coherent interrogating light patterns.

In a particular example embodiment of the distributed acoustic sensing method, in step (a), the time period between successively sent coherent interrogating light patterns may be set to a first time period during a first measurement time duration and may be set to a second time period, which is different from the first time period, during a second measurement time duration.

In an embodiment example of the distributed acoustic sensing method, in step (a), each first coherent interrogating light pattern out of the plurality of first coherent interrogating light patterns may have substantially a same set of physical properties, which set comprises at least a frequency (or wavelength) of the carrier light, an amplitude envelope modulation function, for example a pulse shape, a double pulse shape, or a pulse-based code pattern, and a polarization state of the carrier light.

In the aforementioned example of the distributed acoustic sensing method, the set of physical properties may exclude a mere scaling factor of the amplitude envelope modulation function, for example a scaling factor of a pulse height.

In the aforementioned example embodiment of the distributed acoustic sensing method, furthermore, coherent interrogating light patterns out of the plurality of coherent interrogating light patterns may differ from each other in terms of light intensity and/or in terms of a polylevel coding sequence.

In a first advantageous embodiment example of the distributed acoustic sensing method, according to a first novel approach, when performing step (a), the following operating condition may be met: the time period is equal to or greater than the down-and-up travel time of the optical sensing fiber. In result of the first novel approach, there is at maximum one coherent interrogating light pattern present within the optical sensing fiber at any time.

In the particular example embodiment of the distributed acoustic sensing method, according to the first novel approach, the first and the second time periods may be equal to or greater than the down-and-up travel time of the optical sensing fiber. As a result of this first novel approach, there is at maximum one coherent interrogating light pattern present within the optical sensing fiber at least during the first measurement time duration and during the second measurement time duration.

In an example embodiment of the distributed acoustic sensing method, the first and the second time period may be greater than 130%, preferably less or equal than 130%, more preferably less or equal than 120%, and still more preferably less or equal than 110%, of the down-and-up travel time of the optical sensing fiber.

In an example embodiment of the distributed acoustic sensing method, an inverse of the first time period may correspond to a first pulse repetition frequency present during the first measurement time duration and an inverse of the second time period may correspond to a second pulse repetition frequency present during the second measurement time duration. Herein, one half of the first pulse repetition frequency $f_{pulse,\ 1}$ may correspond to a first Nyquist frequency $f_{Ny,\ 1}$, i.e. $½_{pulse,\ 1} = f_{Ny,\ 1}$ which corresponds to the largest bandwidth of an acoustic event which can be unambiguously determined when the first pulse repetition frequency $f_{pulse,\ 1}$ applies to the repeated sending of the coherent interrogating light pattern during the first measurement time duration. Herein further, one half of the second pulse repetition frequency $f_{pulse,\ 2}$ may correspond to a second Nyquist frequency $f_{Ny,\ 2}$ (i.e. $½f_{pulse,\ 2} = f_{Ny,\ 2}$), which corresponds to the largest bandwidth of an acoustic event which can be unambiguously determined when the second pulse repetition frequency $f_{pulse,\ 2}$ applies to the repeated sending of the coherent interrogating light pattern during the second measurement time duration.

In an example of the first advantageous embodiment of the distributed acoustic sensing method, for an acoustic event having an actual frequency or bandwidth $f_{event}$ greater than the Nyquist frequency $f_{Ny}$, the actual frequency or bandwidth may be mapped to an apparent frequency $f_{apparent}$ that is smaller than the Nyquist frequency $f_{Ny}$ according to:

$$f_{apparent} = abs\ \{(f_{event} + f_{Ny}) \bmod f_{pulse} - f_{Ny}\} \quad (Eq.\ 1)$$

or $$f_{apparent} = abs\ \{(f_{event} + ½f_{pulse}) \bmod f_{pulse} - ½f_{pulse}\} \quad (Eq.\ 2),$$

In an example embodiment of the first advantageous distributed acoustic sensing method, furthermore, the method may further have the following steps:

calculating for an acoustic event, which is detected in measurements performed using interrogating light patterns sent during the first measurement time duration using the first pulse repetition frequency $f_{pulse,\ 1}$, and which has a detected first apparent frequency $f_{apparent,\ 1}$, a first set of possible actual frequencies $f_{event,\ 1}$ greater than the first Nyquist frequency $f_{Ny}$, calculating for an acoustic event, which is detected in measurements performed using interrogating light patterns sent during the second measurement time duration using the second pulse repetition frequency $f_{pulse,\ 2}$, and which has a detected second apparent frequency $f_{apparent,\ 2}$, a second set of possible actual frequencies $f_{event,\ 2}$, greater than the second Nyquist frequency $f_{Ny,\ 2}$, and determining, if in the first set and in the second set, there are one or more common frequency or bandwidth values, which are greater than the first and second Nyquist frequencies, respectively.

In an example embodiment of the distributed acoustic sensing method, the method may further have outputting the one or more common frequency or bandwidth values as a possible actual frequency or bandwidth of an acoustic event.

Technical advantages achieved by the first advantageous distributed acoustic sensing method include that the distributed acoustic sensing method allows, in addition to uniquely detect the location along the fiber of an acoustic events acting on the fiber, to resolve or generally reduce an ambiguity from the possibly detected multiple acoustic frequencies. This ambiguity may be reduced further by sending, during a third measurement time duration, coherent interrogating light patterns spaced in time by a third time period or with a third pulse rate (or, during even further measurement time durations, light patterns spaced by even further time periods or with further pulse rates).

In a second advantageous embodiment of the distributed acoustic sensing method, according to a second novel approach, when performing step (a), the following operating conditions may be met: the time period is smaller than one half of the down-and-up travel time of the optical sensing fiber. In result of the second novel approach, there is at maximum one coherent interrogating light pattern present within the optical sensing fiber at any time.

In the particular example embodiment of the distributed acoustic sensing method, according to the second novel approach, the first and the second time periods may be smaller than one half of the down-and-up travel time of the optical sensing fiber. In result of this second novel approach, a first number, which is greater than one, of coherent interrogating light patterns may be present within the optical sensing fiber at any time during the first measurement time duration, and a second number, which is greater than one and different from the first number, of coherent interrogating light patterns may be present within the optical sensing fiber at any time during the second measurement time duration.

In an example embodiment of the distributed acoustic sensing method consistent with the second approach, the first and the second time periods may be smaller than one third (33%), preferably smaller than one fifth (20%), more preferably smaller than 16%, more preferably smaller than 12%, more preferably smaller than 10%, more preferably smaller than 5%, of the down-and-up travel time of the optical sensing fiber.

In an embodiment example of the second advantageous embodiment example of the distributed acoustic sensing method, the method may further have the following steps:

detecting, during the first measurement time duration, a first set of detected apparent acoustic events, which apparently occur at first-set fiber sensing portions, the positions of which are related by a first ambiguity corresponding to the first number of coherent interrogating light patterns being present in the optical sensing fiber, and detecting, during the second measurement time duration, a second set of detected apparent acoustic events, which apparently occur at second-set fiber sensing portions, the positions of which are related by a second ambiguity corresponding to the second number of coherent interrogating light patterns being present in the optical sensing fiber, and determining whether one of the first-set fiber sensing portions out of the first set of detected apparent acoustic events corresponds to one of the second-set fiber sensing portions out of the second set of detected apparent acoustic events.

In an example embodiment of the distributed acoustic sensing method, the method may further have:

if one of the first-set fiber sensing portions out of the first set of detected apparent acoustic events corresponds to one of the second-set fiber sensing portions out of the second set of detected apparent acoustic events, resolving the first and the second ambiguity by determining the corresponding fiber sensing portion as the fiber sensing portion related to a detected same apparent acoustic event, which caused the first and second sets of detected acoustic events.

Technical advantages achieved by the distributed acoustic sensing method include that the distributed acoustic sensing method allows, in addition to uniquely determine the acoustic frequency (or acoustic bandwidth) of an acoustic events acting on the fiber, to resolve or generally reduce an ambiguity from the possibly detected multiple locations. This location ambiguity may be reduced further by sending, during a third measurement time duration, coherent interrogating light patterns spaced in time by a third time period or with a third pulse rate (or, during even further measurement time durations, light patterns spaced by even further time periods or with further pulse rates).

The advantageous examples of the distributed acoustic sensing method according to the first novel approach and according to the second novel approach can also be combined in the sense that the operating conditions according to the first novel approach and the operating conditions according to the second novel approach are implemented successively in the distributed acoustic sensing method. The successive implementation may be performed in the stated sequence or in an inverse sequence.

According to a further embodiment there is established a computer-readable storage medium storing a computer program for controlling or executing the method as described above, when the program is run on a data processing system, such as a computer.

According to a still further embodiment there is established a computer program for controlling or executing the method as described above, when the program is run on a data processing system, such as a computer.

BRIEF DESCRIPTION OF THE DRAWINGS

In the following, exemplary embodiment examples of the present invention are described in detail with reference to the following figures.

DETAILED DESCRIPTION OF ILLUSTRATED EMBODIMENTS

Figure 1:
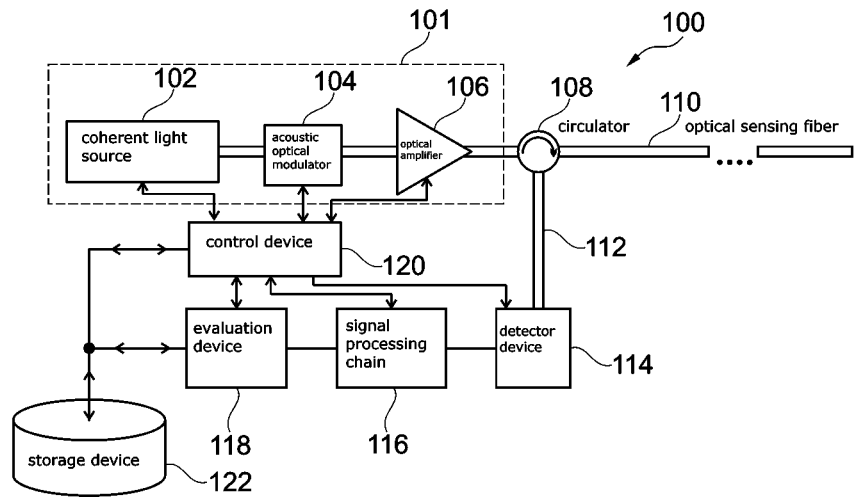
FIG. 1 shows a first embodiment of a Distributed Optical Sensing system, which enables "intensity DAS" measurements, and in which embodiments of the present invention can be implemented.

Similar or like components in different figures are provided with the same reference numerals.

Before exemplary embodiment examples of the invention are described with reference to the figures, some general aspects of the present invention according to considerations of the inventor(s) shall still be explained.

A device repeatedly sending a coherent interrogating light pattern into a sensing fiber, analyzing the backscatter signal over time, extracting changes on the fiber over time from the analyzed signal, wherein the interrogating light patterns are out of at least one family, wherein each interrogating light pattern within a family has substantially the same physical properties. An aspect of the present invention is that the period between sending a pattern of a family is varying over time, namely at a time scale that is greater than a minimum measurement time of at least two times the down-and-up travel time associated to the fiber, for example the period may be changed once per second.

Herein the expression "repeatedly" means that the coherent light pattern may even be sent with a rate that allows unambiguous target acoustic sampling in observation of the Nyquist theorem, i.e. above the Nyquist frequency. In the example explained above with reference to FIG. 3, for an optical sensing fiber 110 having a length of 50 km, where the Nyquist criterion allows an unambiguous detection of frequencies of only up to approximately 1 kHz, the sending rate of repetition frequency may be e.g. even 10 kHz or higher.

Herein the expression "interrogating light pattern" refers in the simplest case to a single light pulse, though it may refer to a double pulse or to a code or coding pattern, as e.g. in WO 2017/037453 A1.

Herein the expression "analyzing" may refer to a method step that includes measuring the intensity of backscattered light ("intensity DAS"), or measuring the intensity of the signal of backscattered light interfering with a signal output from local oscillator (including the sending laser), or measuring the intensity when interfering a signal of backscattered light with a same backscatter shifted (e.g. by using a delay line) in time, so as to derive the intensity and/or the phase of the optical backscatter.

In an example embodiment according to a first novel approach, it may be provided, i.e. the pattern repetition rate of (or time period between) successively sent light patterns is adjusted, so that not more than one (i.e. at maximum one) pattern of a family is present within the fiber at the same time.

In an example embodiment according to a second novel approach, it may be provided, i.e. the pattern repetition rate of (or time period between) successively sent light patterns is adjusted, so that more than one pattern of a family is within the fiber at the same time. This second approach allows the resolution of higher acoustic frequencies due to use of a higher repetition rate, but would conventionally, i.e. without varying the period between sending a pattern of a family over time, make the determination of the location (or distance from the launching position) of the acoustic/strain event ambiguous, that is the second approach would conventionally not allow an unambiguous determination of the location (or distance) of the acoustic/strain event.

Herein the expression "extracting changes on the fiber" refers for example to the optical path length within the optical sensing fiber, which may be affected by acoustic signals causing strain oscillations on the sensing fiber, or environmental temperature changes affecting the temperature of the sensing fiber.

Herein the expression "same physical properties" (which characterize interrogating light patterns belonging to a same "family") is to be understood in the sense that the respective backscatter resulting from different interrogating light patterns belonging to a same family are not separated or discriminated in the receiver, when overlaid with the backscatter of another pattern from the same family. Herein, the physical properties, which characterize a family, may be one or more of the properties selected from a group, which comprises: polarization, number of pulses (e.g. single pulse or double pulses or a pulse pattern) or code pattern (i.e. changing intensity or other pulse parameters in a pulse sequence), wavelength or frequency (e.g. shift of the optical frequency by, for example, 80 MHz or 200 MHz). It is to be understood that the physical properties, which characterize a family, are not intended to comprise mere changes of the intensity of a light pulse or a pulse sequence, nor mere changes of a mere scaling factor of an amplitude envelope modulation function, for example a scaling factor of a pulse pattern or a scaling factor of a code pattern, where such physical properties have no impact on the measurement results or the result of signal processing employed according to the present disclosure.

The proposed device can be used to reduce or remove an ambiguity of location identification and/or to reduce or remove an ambiguity of acoustic frequency (or frequency spectrum) identification; an ambiguity in identifying the location of an acoustic/strain event results under operating conditions causing the presence of several interrogating light patterns in the fiber (e.g. adjusting the time period between two successively sent light patterns to be smaller than the down-and-up travel time) from a "folding in space"; an ambiguity in identifying the acoustic frequency (or frequency spectrum) results, when the repetition rate is below the Nyquist frequency associated to the acoustic/strain event. The issues of resolving the ambiguity in location identification and resolving the ambiguity in acoustic frequency identification will be explained in more detail below with reference to FIGS. 5 and 6.

The first novel approach and the second novel approach may be combined in the sense that the first novel approach and the second novel approach are implemented successively. Implementing the first novel approach and the second novel approach in succession allows both to identify unambiguously a high acoustic frequency (or bandwidth) (by adjusting a high repetition rate that is greater than the Nyquist frequency) of an acoustic/strain event and to identify unambiguously the location of the acoustic/strain event. The successive implementation may be performed in the stated sequence (i.e. implementing the first novel approach and then the second novel approach) or in an inverse sequence (i.e. implementing the second novel approach and then the first novel approach).

Measurement Systems

FIG. 1 shows a first embodiment of a distributed optical sensing (DAS) system 100, which enables "intensity DAS" measurements. The DAS system 100 comprises: a coherent light source device 101, which in turn has a coherent light source 102, such as a laser, which outputs a light beam comprising a carrier light, an acousto-optical modulator 104, which receives the light beam output from the light source 102, modulates the light beam, and outputs a modulated light beam comprising a sequence of composed interrogating light patterns, and an optical amplifier 106, which inputs the modulated light beam, amplifies the modulated light beam, and outputs an amplified, modulated light beam; an optical sensing fiber 110; a backscatter branch fiber 112; and a circulator 108, which receives the amplified, modulated light beam, outputs the amplified, modulated light beam for coupling into a launching end of the optical sensing fiber 110, receives from the launching end of the fiber 110 backscattered light generated in the fiber 110, and outputs the received backscattered light into the backscatter branch fiber 112, which guides the received backscattered light to a detector device 114.

The DAS system 100 further comprises the detector device 114, which detects over time received backscattered light and converts it into an electrical signal, which is indicative of the received backscattered light, and outputs the generated signal, a signal processing chain 116, which processes the signal for further evaluation, an evaluation device 118, which receives the processed signal and evaluates the signal to determine and derive therefrom (or identify) desired information, a control device 120, a storage device 122, which is operatively and communicatively coupled to the control device 120 and to the evaluation device 118, and is capable to store time series or traces 306, 506, 606 of the interrogating light, time series or traces of the processed signal, and information derived from the processed signal, for later use by, and/or display to, a user.

The control device 120 is capable to control the operation of the coherent light source 102, including the switching on and off of the light beam comprising the carrier light and, if applicable, a frequency of the light beam/carrier light, an intensity of the light beam/carrier light and/or a modulation type (continuous light, pulsed light) of the light source 102. The control device 120 is further capable to control the operation of the acousto-optical modulator 104, including the control of the composition of the interrogating light pattern, such as a pulse length, a pulse height, a pulse sequence comprising at least two pulses having defined pulse lengths and defined pulse distances, a pulse code comprising a pulse sequence modulated by an amplitude envelope modulation function, and, notably, a time period between successively sent interrogating light patterns. The control device 120 is further capable to control the operation of the optical amplifier 106, including a gain factor. A skilled person knows how to compose a desired interrogating light pattern 306, 506, 606 having a controllable time period between successively generated interrogating light patterns with use of the light source 102, the acousto-optical modulator 104, the optical amplifier 106, which are under control of the control device 120.

The control device 120 is further capable to control the operation of the detector device 114, including the switching off and on, a gain factor, and a dead time, if applicable. The control device 120 is further capable to control the operation of the signal processing chain 116, including the control and performing of functions such as sampling an analogue signal received from the detector device 114, converting the sampled analogue signal in a digital signal, recording a time series (or trace) of e.g. digitized signals, averaging a signal or a time series of signals over time, e.g. to reduce noise, filtering a signal or a time series of signals (e.g. low-pass filtering to reduce noise), comparing a signal corresponding to a received backscattered light pattern with a composed, desired interrogating light pattern, e.g. by calculating a convolution of the patterns, to determine if a received backscattered light pattern corresponds to a launched interrogating light pattern. Such functionality of the signal processing chain 116 is known to a skilled person.

The control device 120 is further capable to control the operation of the storage device 122, including the storing of data and information in the storage device 122 and the access to and reading of stored data and information from the storage device 122.

The control device 120 is further capable to control the operation of the evaluation device 118, including determining a run-time for an interrogating light signal to propagate down the optical sensing fiber 110 to a backscattering site, such as an acoustic/strain event, and the backscattered light to propagate up the fiber 110 and to the detector device 114, converting a determined run-time in a location (of the backscattering site) along the sensing fiber 110 or a distance (of the backscattering site) from the launching end of the fiber 110, to identify a position along the optical sensing fiber 110 of a backscattering site, such as an acoustic/strain event 308, 508, 608, sampling signals or traces of signals from backscattered light, and reconstructing a signal corresponding to an acoustic/strain event to identify the frequency thereof or the frequency band comprised therein. Such functionalities of the control device 120 are known to a skilled person.

The control device 120 is notably capable to control the operation of the evaluation device 118 such that the evaluation device 118 performs the determination, evaluation and identification tasks required to perform the DAS method according to the invention, and implementation embodiments as described herein with reference to FIGS. 3 to 7, in particular the implementation embodiments described in detail below with reference to FIGS. 5 and 6.

Figure 2:
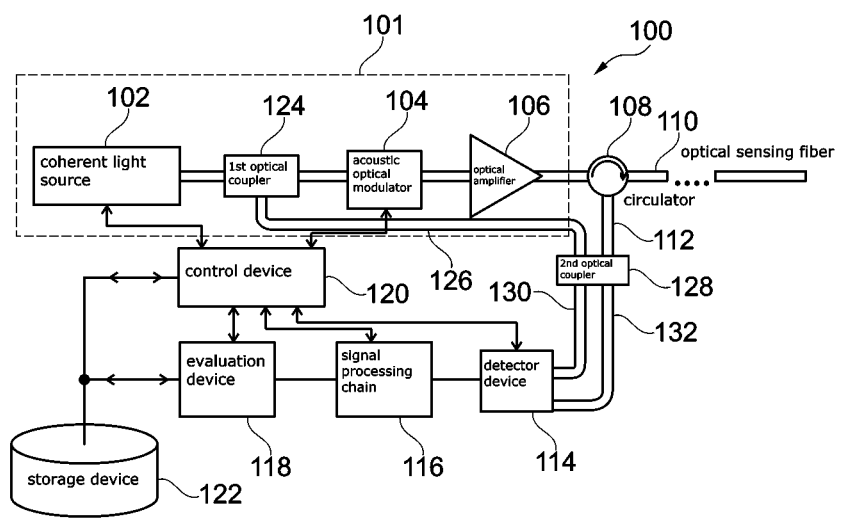
FIG. 2 shows a second embodiment of a Distributed Optical Sensing system, which enables "phase DAS" measurements, and in which embodiments of the present invention can be implemented.

FIG. 2 shows a second embodiment of a Distributed Optical Sensing system, which enables "phase DAS" measurements. The DAS system 100 shown in FIG. 2 comprises: a coherent light source device 101, which in turn has a coherent light source 102, such as a laser, an acousto-optical modulator 104, and an optical amplifier 106; a circulator 108; an optical sensing fiber 110; a backscatter branch fiber 112; a detector device 114; a signal processing chain 116; an evaluation device 118; a control device 120; and a storage device 122, which are capable to operate and perform function as described above with reference to FIG. 1.

The DAS system 100 shown in FIG. 2 comprises, in addition to the elements shown in and described with reference to FIG. 1, the following elements: a first optical coupler 124, an outcoupling optical fiber 126, a second optical coupler 128, a first detection fiber 132, and a second detection fiber 134.

The coherent light source 102 is operated in cw (continuous wave) mode and outputs a coherent light beam having a constant intensity. The first optical coupler 124 receives the light beam output from the coherent light source 102, couples a first portion of the received light beam out of a straight optical path and into an input end of the outcoupling optical fiber 126, and leaves a second portion of the received light beam to propagate along its straight optical path for inputting this second portion of the light beam into the acousto-optical modulator 104. The acousto-optical modulator 104, which is under the control of the control device 120, composes the interrogating light pattern 307, 507, 607 as in the embodiment of FIG. 1 and outputs a light beam having the composed interrogating light pattern 307, 507, 607 to the optical amplifier 106 for amplification, under the control of the control device 120 as in the embodiment of FIG. 1, and outputting to the circulator 108 for launching/coupling the interrogating light pattern 307, 507, 607 into the launching end of the optical sensing fiber 110 and receiving/coupling out backscattered light generated within the fiber 110 as in the embodiment of FIG. 1, and then coupling the backscattered light via the backscatter branch fiber 112 into a first input of the second optical coupler 128.

The outcoupling optical fiber 126 guides the first portion of the received beam of cw light into a second input of the second optical coupler 128. The second optical coupler 128 couples backscatter light so as to interfere with coherent cw light coupled out from the coherent light source 102. In this way, the outcoupling optical fiber 126, with the supply of the first portion of coherent cw light output from the coherent cw-operated light source 102, acts as a local oscillator, and provides the first portion of coherent cw light output from the coherent light source 102 as a reference for interference with the backscattered light generated in the optical sensing fiber 110 and coupled via the circulator 108 and the backscatter branch fiber 122.

As is known to a skilled person, this interference arrangement allows to detect, among others, the phase of backscattered light in relation to the local oscillator reference signal, and to derive from the detected phase among others the time-of-flight and therefrom the location of the backscattering site in the sensing optical fiber. As is further known to a skilled person, the interference arrangement further allows to detect a frequency difference between the backscattered light and the local oscillator reference light, and thus a frequency component from the acoustic/strain event 308, 508, 608 as contained in the backscattered light due to the interaction of the interrogating light with the acoustic/strain event 308, 508, 608.

The second optical coupler 128 provides, via the respective first and second detection fibers 130, 132, signals resulting from the interference of the backscatter light with the local oscillator reference cw light to a respective first and second input of a balanced detector device 114, which converts the input light(s) and produces an electrical signal which is indicative of the backscattered light, and provides the electrical signal to the signal processing chain 116 for signal processing and further transmission to the evaluation device 118. The signal processing chain 116 and the evaluation device 118 are capable to provide functionality similar to that in the embodiment of FIG. 1.

In particular, the evaluation device 118, which is under the control of the control device 120, performs the determination, evaluation and identification tasks required to perform the DAS method according to the invention as defined in the appended claims, and implementation embodiments as described hereinafter, in particular the advantageous first and second implementation embodiments described in the following as an inventive improvement over the state of the art illustrated in FIG. 3 and the implementation embodiments described with reference to FIGS. 5 and 6.

First Implementation Embodiment: Change Light Pattern Period with One Pattern in the Fiber at a Time With respect to a conventional DAS system operated as explained above with reference to FIG. 3, which has limitations as described above, some of the limitations can be overcome according to a first novel implementation embodiment of a DAS system 100, which involves changing the pulse pattern period, i.e. the time period between sending the coherent interrogating light pattern, over two or more measurement time durations, while observing the operating condition to have only one coherent interrogating light pattern in the optical fiber 110 at a time.

Figure 3:
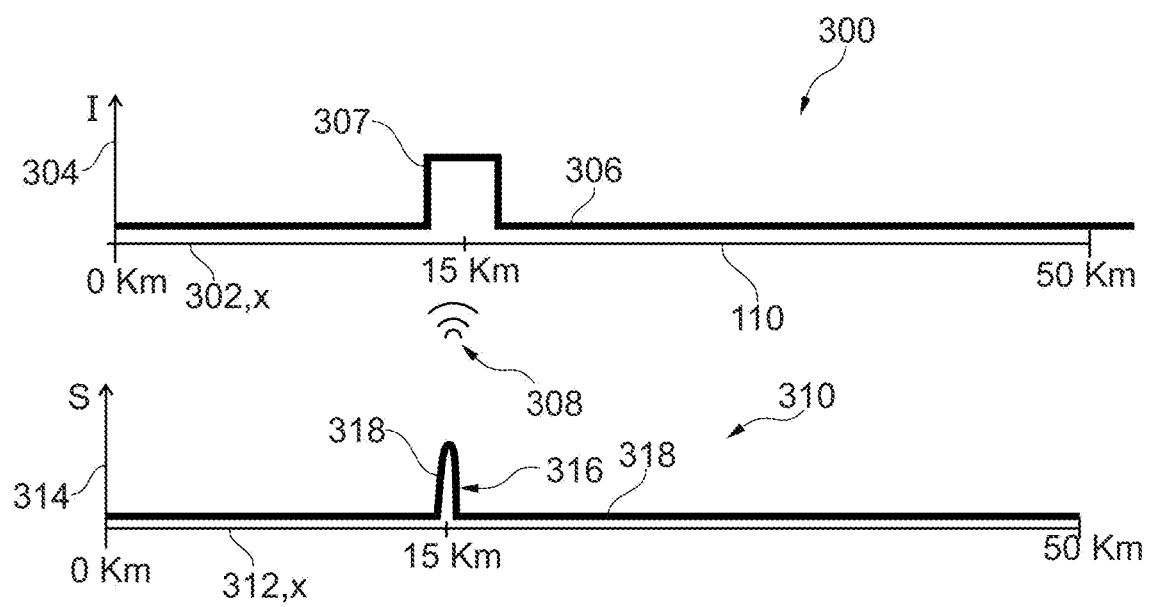
FIG. 3 shows, in the upper portion, an optical sensing fiber having an exemplary length of 50 km, into which fiber light pulses are repeatedly sent into the optical sensing fiber at a frequency of approximately 2 kHz, so that one pulse of interrogating light is present in the fiber at a time, and on which fiber an acoustic event is impacting on and straining the optical sensing fiber locally at a location at a distance of approximately 15 km from the light input end of the optical sensing fiber, and, in the lower portion, a trace of a detected strain profile along the optical sensing fiber indicating the unambiguously detected strain event.
Figure 4:
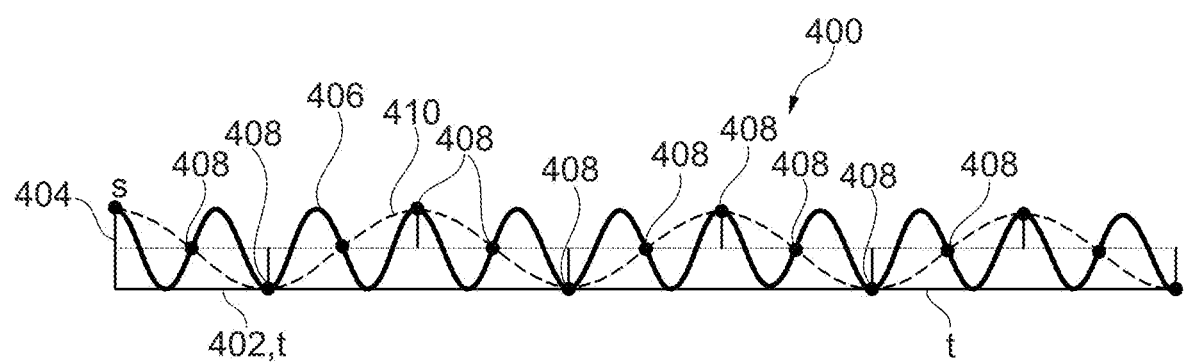
FIG. 4 shows a sinusoidal signal having a particular frequency shown as a continuous line as a function of time, sampling points for a situation of undersampling as indicated by black bullets, and a reconstructed signal obtained using the sampling points and having a particular detected frequency (shown as a dashed line), wherein the sampling points reflect a signal having a sampling frequency below the Nyquist frequency, so that the reconstructed signal has a frequency that is mirrored into the range of frequencies up to the Nyquist frequency.

In order to overcome the conventional "fiber length <--> acoustic bandwidth limitation", it is proposed to start from a DAS in an ordinary constellation, such as shown e.g. in FIG. 3, wherein e.g. a 50 km fiber 110 is sampled with pulse rate of approximately $f_{pulse}$=2 kHz (per label if applicable), assuring that there is maximal one pulse pattern (and its backscatter) in the fiber 110 at any time.

The Nyquist frequency $f_{Ny}$ is known to be a band of $f_{pulse}/2$=1 kHz. That is, any acoustic event is usually mapped to the range 0 . . . 1 kHz (including zero Hz), which may be called the first Nyquist zone. This means that an acoustic event of frequency $f_{event}$ appears at a frequency $f_{apparent}$, which can be described by the following equation:

$$f_{apparent}=|(f_{event}+f_{Ny})\bmod f_{pulse}-f_{Ny}|, \quad \text{(Eq. 3)}$$

wherein '| . . . |' is the absolute of the enclosed expression, and 'mod' is the modulo operation.

An example of measuring an event of e.g. 2.6 kHz acoustic frequency with a 2 kHz pulse rate is presented in Table T1.

TABLE T1

Example operation employing 2 kHz pulse rate

| $f_{event}$ | $f_{apparent}$ |
|---|---|
| 0.6 kHz | 0.6 kHz |
| 0.8 kHz | 0.8 kHz |
| 2.6 kHz | 0.6 kHz |

The operation example presented in Table 1 illustrates that 0.6 kHz and 2.6 kHz events apparently appear at the same frequency in the DAS measurement result. Thus, there is an ambiguity in view of determining the real frequency (or bandwidth) of the acoustic event.

If it is desired to know the real frequency of an acoustic event, rather than to just see that there is an acoustic event at an unknown or ambiguous frequency or frequency range, the ambiguity needs to be resolved. The solution according to the first implementation embodiment of the invention is to switch the pulse rate to a different value, which may still be near the optimum rate for the given length of the sensor fiber 110, which ensures that only one coherent interrogating light pattern (here: light example still assures that at maximum one pulse (and its backscatter) propagates in the fiber 110 at a same time during the measurement.

For a switched pulse rate of e.g. approximately 1.8 kHz, the apparent frequency translates to what is presented in Table 2.

TABLE T2

Example operation employing 1.8 kHz pulse rate

| $f_{event}$ | $f_{apparent}$ |
|---|---|
| 0.6 kHz | 0.6 kHz |
| 0.8 kHz | 0.8 kHz |
| 2.6 kHz | 0.8 kHz |

It can be seen from Table 2 that the frequency of the 2.6 kHz event cannot be identified unambiguously with either pulse rate. However, it can be identified according to the first embodiment example of the invention, if the apparent frequencies with different pulse rates are compared.

This means that by changing the pulse rate, i.e. the time period between sending successive coherent interrogating light patterns, over time, e.g. in, for example two or more consecutive, measurement time durations, to two or more different frequencies, the frequency ambiguity can be resolved or generally reduced. A third and more different pulse rate, i.e. the time period between sending the coherent interrogating light patterns in a third and further measurement time duration, can be applied, in order to further reduce or eliminate the ambiguity if the frequency (or bandwidth) of the acoustic event is larger.

Using the language of the appended patent claims 6 to 11, the determination example indicated hereinbefore may be described more generally as follows.

In the DAS system 100, operating conditions are set such that the time period between consecutively sent coherent interrogating light patterns is equal to or greater than the down-and-up travel time of the optical sensing fiber 110. In particular, a first time period during a first measurement time and a second time during a second measurement period are equal to or greater than the down-and-up travel time of the optical sensing fiber 110. For example, the first and the second time period may be greater than 130%, preferably less or equal than 130%, more preferably less or equal than 120%, still more preferably less or equal than 110%, of the down-and-up travel time of the optical sensing fiber 110.

In the distributed acoustic sensing (DAS) device 500, an inverse of the first time period corresponds to a first pulse repetition frequency present during the first measurement time duration, and an inverse of the second time period corresponds to a second pulse repetition frequency present during the second measurement time duration. Also, one half of the first pulse repetition frequency $f_{pulse,\,1}$ corresponds to a first Nyquist frequency $f_{Ny,\,1}$ (i.e. $\frac{1}{2}f_{pulse,\,1}=f_{Ny,\,1}$), which corresponds to the largest bandwidth of an acoustic event which can be unambiguously determined when the first pulse repetition frequency $f_{pulse,\,1}$ applies to the repeated sending of the coherent interrogating light pattern during the first measurement time duration. Likewise, one half of the second pulse repetition frequency $f_{pulse,\,2}$ corresponds to a second Nyquist frequency $f_{Ny,\,2}$ (i.e. $\frac{1}{2}f_{pulse,\,2}=f_{Ny,\,2}$), which corresponds to the largest bandwidth of an acoustic event which can be unambiguously determined when the second pulse repetition frequency $f_{pulse,\,2}$ applies to the repeated sending of the coherent interrogating light pattern during the second measurement time duration.

It is recalled that for an acoustic event having an actual frequency or bandwidth $f_{event}$ greater than the Nyquist frequency $f_{Ny}$, the actual frequency or bandwidth is mapped to an apparent frequency $f_{apparent}$ that is smaller than the Nyquist frequency $f_{Ny}$ according to:

$$f_{apparent}=\mathrm{abs}\{(f_{event}+f_{Ny})\bmod f_{pulse}-f_{Ny}\} \quad \text{(Eq. 3)}$$

or, expressed differently:

$$f_{apparent}=\mathrm{abs}\{(f_{event}+\tfrac{1}{2}f_{pulse})\bmod f_{pulse}-\tfrac{1}{2}f_{pulse}\} \quad \text{(Eq. 4).}$$

The evaluation device 118 of the system 500 is configured (i) to calculate, for an acoustic event, which is detected in measurements performed using interrogating light patterns sent during the first measurement time duration using the first pulse repetition frequency $f_{pulse,\,1}$, and which has a detected first apparent frequency $f_{apparent,\,1}$, a first set of possible actual frequencies $f_{event,\,1}$ greater than the first Nyquist frequency $f_{Ny,\,1}$, (ii) to calculate, for an acoustic event, which is detected in measurements performed using interrogating light patterns sent during the second measurement time duration using the second pulse repetition frequency $f_{pulse,\,s}$, and which has a detected second apparent frequency $f_{apparent,\,2}$, a second set of possible actual frequencies $f_{event,\,2}$ greater than the second Nyquist frequency $f_{Ny,\,2}$, and (iii) to determine, if in the first set and in the second set, there are one or more common frequency or bandwidth values, which are greater than the first and second Nyquist frequencies, respectively.

The evaluation device 118 is further configured to output, e.g. on an output device or a display device (not shown), the one or more common frequency or bandwidth values as a possible actual frequency or bandwidth of an acoustic event 508.

Second Implementation Embodiment: Change Light Pattern Period Having Multiple Patterns in the Fiber at a Time With reference to FIGS. 5 and 6, according to a second implementation embodiment of the invention, the DAS system 500, 600 is operated such that multiple coherent interrogating pulse patterns (here: light pulses) 507 are present in the fiber 110 at a time. This represents another solution to overcome the "fiber length <--> acoustic bandwidth limitation", which involves sending a next coherent interrogating light pattern out of a plurality of coherent interrogating light patterns, which are sent into the fiber 110 during a measurement time period, i.e. a next light pattern out of a family of light patterns, into the fiber 110 after a period that is shorter than the light round-trip time for the length of the fiber 110.

Increasing the pulse rate e.g. from 2 kHz to 10 kHz on a 50 km fiber results in five pulse patterns (and their backscatter) propagating along the fiber 110 at any time, corresponding to e.g. 10 km distance between consecutive light patterns in the fiber 110 with respect to the backscatter reaching the detection device 114, 116 (receiver) of the DAS system. An acoustic event 508 is probed by a light pulse 507 with five times the rate. An acoustic event 508 acting on the fiber 110 e.g. at location 15 km is sampled by the detection device 114, 116, in addition to the real location at location 15 km, also as a set of further apparent acoustic events at locations 5 km, 25 km, 35 km and 45 km, as is illustrated in FIG. 5.

Figure 5:
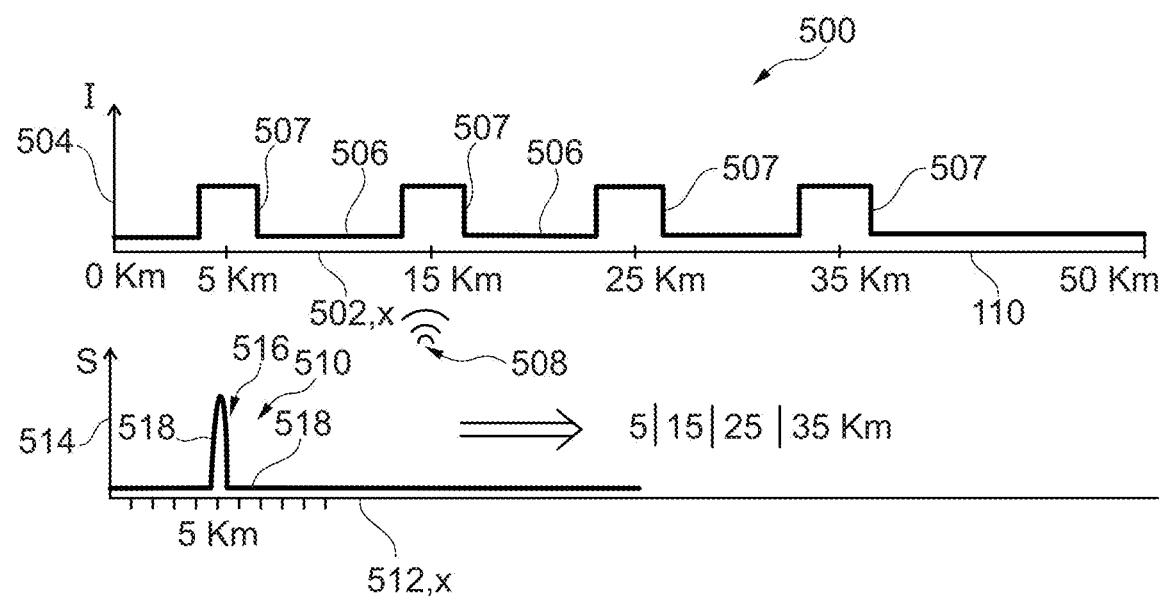
FIG. 5 shows, in the upper portion, an optical sensing fiber having an exemplary length of 50 km, into which fiber light pulses are repeatedly sent into the optical sensing fiber at a frequency of approximately 10 kHz, so that approximately five pulses of interrogating light are present in the fiber at a time, on which fiber an acoustic event is impacting on and straining the optical sensing fiber locally at a location at a distance of approximately 15 km from the light input end of the optical sensing fiber, and, in the lower portion, a trace of a detected strain profile along the optical sensing fiber indicating that the acoustic event at a distance of 15 km from fiber input end is detected every 100 µs (corresponding to the pulse period), ca. 50 µs (or approximately 5 km) after pulse launch, but it cannot be resolved, which one of the candidate pulses appearing at locations of 5 km, 15 km, 25 km, 35 km and 45 km has actually caused the acoustic event.

FIG. 5 shows a profile 500 (or trace 506) of coherent interrogating light patterns 507 that have been launched into an optical sensing fiber 110. The profile 500 (or trace 506) is drawn with respect to an x-axis 502, which extends horizontally in FIG. 5 and depicts a scale for the distance x measured along the fiber 110, and a y-axis 504, which extends vertically in FIG. 5 and depicts a scale for the intensity I measured along the fiber 110. The trace 506 of the interrogating light intensity shows a series of coherent interrogating light patterns, here implemented simply as light pulses 507, of which one light pulse—namely the one shown at location x=15 km)—is about to pass by an acoustic event 508 which affects the optical sensing fiber 110. In particular, FIG. 5 shows a sensor fiber 110 having a length of 50 km and carrying coherent interrogating light patterns embodied as light pulses 507, which are launched into the fiber 110 at a pulse rate of 10 kHz. Accordingly, at any time, more than one pulse 507 (or their backscatter) propagates in the fiber 110.

In particular, as is illustrated in FIG. 5, the at any time ca. five light pulses 507, which are present within the fiber 110, lead to an ambiguity in view of determining the real location of the acoustic event 508. The acoustic event 508 at location x=15 km is detected apparently multiple times every 100 µs, which corresponds to the pulse period. A first appearance occurs apparently at 50 µs, which corresponds to a light propagation distance of 5 km, after last pulse pattern launch, but it cannot be resolved, which one of the pulses 507 at locations x=5 km, 15 km, 25 km, 35 km and 45 km cause the acoustic event 508.

In result of such an operation of the fiber 110 as illustrated in FIG. 5, there is an ambiguity in locating an acoustic event.

For applications, which require a detection and/or an identification of acoustic events using pulses 507 (or generally coherent interrogating light patterns) with a high frequency (i.e. a low pulse period that is lower than the down-and-up travel time associated with the fiber 110), but which do not necessarily require the location unambiguously, such determination may be sufficient.

However, according to the second implementation embodiment of the invention, in addition to the determination of multiple apparent locations of the acoustic event as illustrated in FIG. 5, it is possible to unambiguously locate the acoustic event 508 by time-of-flight at fiber location x=15 km.

Figure 6:
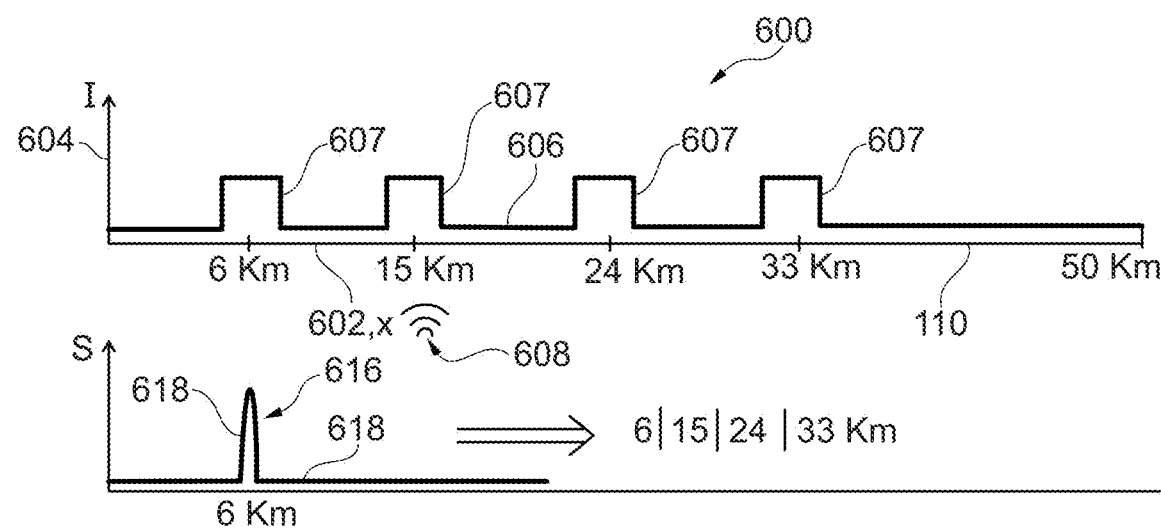
FIG. 6 shows, in the upper portion, an optical sensing fiber having an exemplary length of 50 km, into which fiber light pulses are repeatedly sent into the optical sensing fiber at a frequency of approximately 11.1 kHz, so that approximately five pulse of interrogating light are present in the fiber at a time at 6 km, 15 km, 24 km, 33 km and 42 km (not shown), on which fiber an acoustic event is impacting on and straining the optical sensing fiber locally at a location at a distance of approximately 15 km from the light input end of the optical sensing fiber, and, in the lower portion, a trace of a detected strain profile along the optical sensing fiber indicating that the acoustic event at a distance of 15 km from fiber input end is detected every 90 µs has (corresponding to the pulse period), after pulse launch, but it cannot be resolved, which one of the candidate pulses appearing at locations of 6 km, 15 km, 24 km, 33 km and 42 km has actually caused the acoustic event.

If the acoustic event 508 is to be located in this pulse sequence operation, in which multiple interrogating light patterns are present in the fiber 110 at a time, in addition to the operation illustrated in FIG. 5, the coherent interrogating light pattern (or pulse) period, i.e. the time period between sending coherent interrogating light patterns (or pulses 507), may be varied over time, e.g. in, for example consecutive, measurement time durations, to allow to resolve the ambiguity, as is described by way of example with reference to FIG. 6.

FIG. 6 shows a profile 600 (or trace 606) of coherent interrogating light patterns (here: pulses 607), which have been launched into an optical sensing fiber 110. The profile 600 (or trace 606) is drawn with respect to an x-axis 602, which extends horizontally in FIG. 6 and depicts a scale for the distance x measured along the fiber 110, and a y-axis 604, which extends vertically in FIG. 6 and depicts a scale for the intensity I measured along the fiber 110. The trace 606 of the interrogating light intensity shows a series of light pulses 607 as an embodiment of coherent interrogating light patterns, of which one light pulse—namely the one shown at location x=15 km—is about to pass by an acoustic event 608 that affects the optical sensing fiber 110. In particular, FIG. 6 shows a sensor fiber of length 50 km carrying coherent interrogating light patterns embodied as light pulses 607, which are launched into the fiber 110 at a pulse rate of 11.1 kHz. Accordingly again, as in FIG. 5, more than one pulse 607 (or their backscatter) propagate in the fiber 110 at a time.

In the interrogating light profile 600 shown in FIG. 6, which involves a pulse rate of 11.1 kHz, the acoustic event 608 at location x=15 km is detected every 90 µs according to the slightly changed pulse period, corresponding to a light propagation distance of Δx=9 km), with a first appearance occurring now apparently at 60 µs, which corresponds to a light propagation distance of 6 km after the launch of the last light pattern. The determination of the location of the acoustic event 608 is again ambiguous, in this example at locations x=6 km, 15 km, 24 km, 33 km and 42 km.

It is pointed out that in the examples shown in the FIGS. 5 and 6, the ambiguity in the determination of the location of the acoustic events 508, 608 can be resolved, based on the observation that only an acoustic event 508, 608 at location x=15 km is common to both traces 506, 606.

Using the language of the appended patent claims 12 to 15, the determination example indicated hereinbefore with reference to FIGS. 5 and 6 may be described more generally as follows.

A distributed acoustic sensing (DAS) system 100 according to the second implementation embodiment of the invention, is operated such that the operating condition is met that the time period between two consecutive coherent interrogating light patterns 507, 607 is smaller than one half of the down-and-up travel time of the optical sensing fiber 110. In particular, a first time period during a first measurement time and a second time period during second measurement time are smaller than one half of the down-and-up travel time of the optical sensing fiber 110. In particular, the first and the second time periods are smaller than one third (33%), preferably smaller than one fifth (20%), more preferably smaller than 16%, more preferably smaller than 12%, more preferably smaller than 10%, more preferably smaller than 5%, of the down-and-up travel time of the optical sensing fiber 110.

In the DAS system 100 according to the second implementation embodiment, the evaluation device 118 is configured: (1) to detect, during the first measurement time duration, a first set of detected apparent acoustic events, which apparently occur at first-set fiber sensing portions, the positions of which are related by a first ambiguity corresponding to the first number of coherent interrogating light patterns 507, 607 being present in the optical sensing fiber 110, (2) to detect, during the second measurement time duration, a second set of detected apparent acoustic events, which apparently occur at second-set fiber sensing portions, the positions of which are related by a second ambiguity corresponding to the second number of coherent interrogating light patterns being present in the optical sensing fiber 110, and (3) to determine whether one of the first-set fiber sensing portions out of the first set of detected apparent acoustic events corresponds to one of the second-set fiber sensing portions out of the second set of detected apparent acoustic events.

The evaluation device 118 is further configured, if one of the first-set fiber sensing portions out of the first set of detected apparent acoustic events corresponds to one of the second-set fiber sensing portions out of the second set of detected apparent acoustic events, to resolve the first and the second ambiguity by determining the corresponding fiber sensing portion as the fiber sensing portion related to a detected same apparent acoustic event 507, 607.

In the first and in the second implementation embodiment, and generally according to the invention, a next coherent interrogating light pattern, such as a light pulse, has to be "of the same family", i.e. its backscatter is not discriminated from the backscatter of other light patterns of the same family at detection. This may be achieved by using, in successive pulse patterns, essentially the same physical parameters, such as polarization, carrier frequency (or wavelength), and amplitude envelope modulation function (or pulse pattern), while allowing to vary the light intensity and/or to vary the levels of a polylevel coding sequence over successive light patterns. This allows a simple setup without any additional elements, such as a polarization modulator, or a frequency shifter or lasers of different wavelength.

Figure 7A:
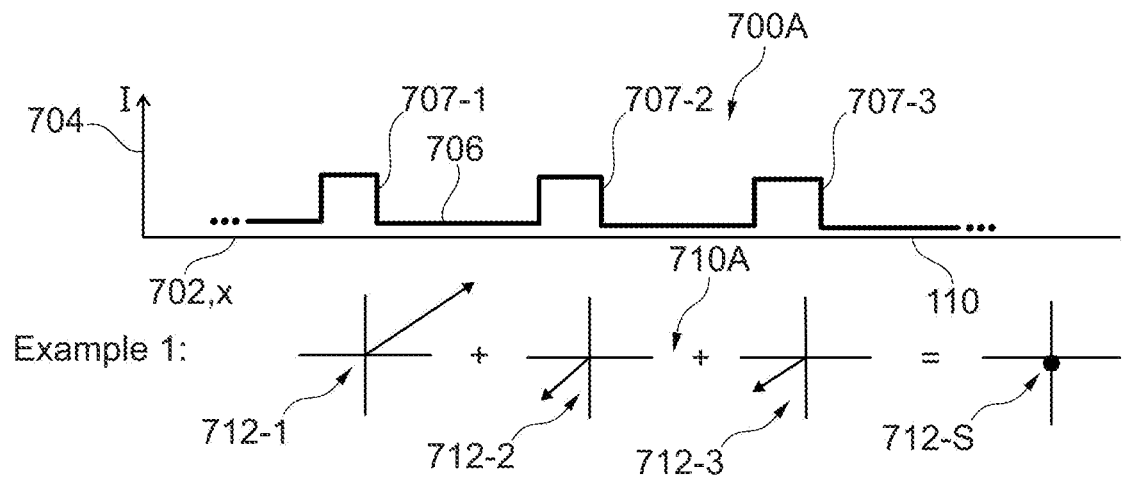
FIG. 7A illustrates, in its upper portion, an optical sensing fiber, in which a first, a second and a third phasor from backscattered light are returned, and, in its lower portion, an example 1 of the sum of the phasors leading to signal fading.
Figure 7B:
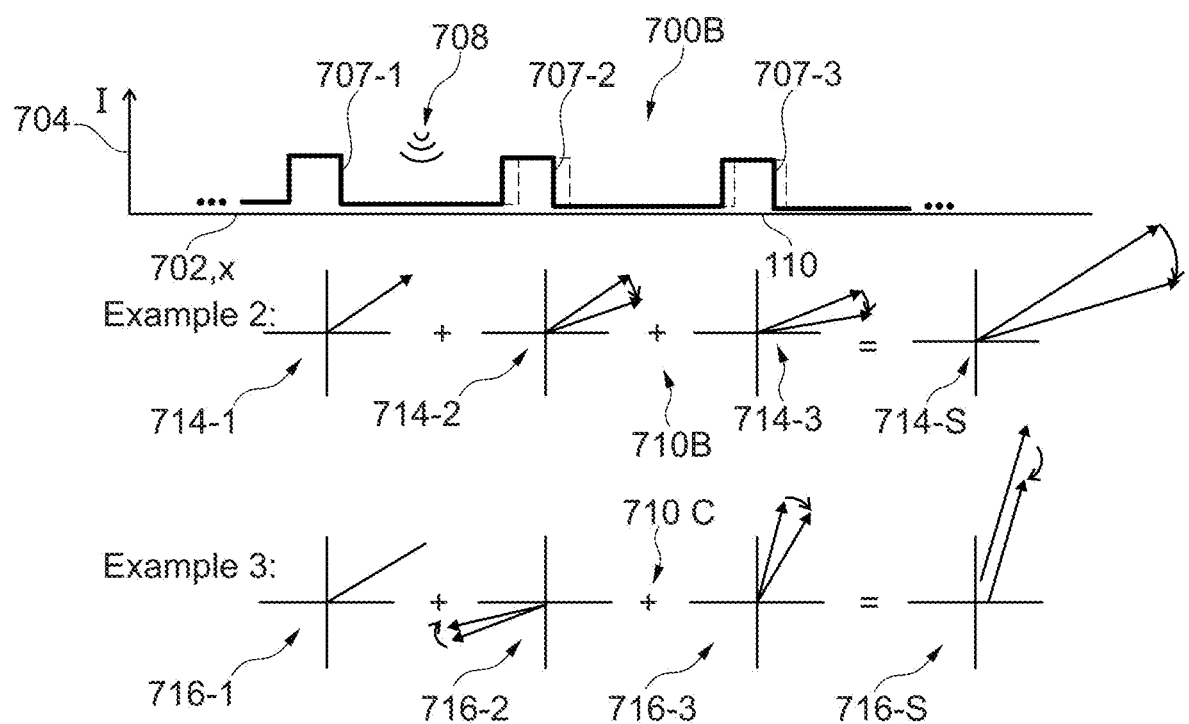
FIG. 7B illustrates, in its upper portion, an optical sensing fiber, in which as an example 1 a first, a second and a third phasor from backscattered light are returned with the sum leading to signal fading, and, in its lower portion, an example 2 and an example 3 of the sum of the phasors leading to sensitivity fading in intensity detection and in phase detection, respectively.

With reference to FIGS. 7A and 7B, a problem occurring in conventional DAS system may involves fading with multiple pulse pattern.

Overcoming the Fading Problem in the Second Implementation Embodiment

Having more than one pulse pattern propagating along the fiber (e.g. two pulses at the same time) means that the backscatter from different locations of the fiber, e.g. in 10 km intervals, interfere on the detector 114, 116. The DAS analysis then is not analyzing the intensity and/or phase of backscatter from a single location as in conventional DAS, where only at maximum one coherent interrogating light pattern is in the fiber at a time, but rather the intensity and/or the phase of a coherent mix. It is known that the Rayleigh backscatter, which can be described by an amplitude and a phase (together referred to as a "phasor") from a finite coherent pulse in a fiber shows a quasi-random variation along the fiber. This is a kind of speckle pattern as is known from coherent illumination of matter. Because the intensity and/or phase at the detector varies during pulse(s) propagation, it can also be called a temporal speckle.

Generally, the coherent superposition of phasors from several locations in the fiber add to a random phasor sum. The phasor of the backscatter from several pulses in a fiber add coherently, leading to a random phasor sum. FIGS. 7A and 7B illustrate particular cases, i.e. phasor traces 710A, 710B and 710C of possible fading from in each case three pulses 707 of backscatter light.

One fading mechanism is shown in FIG. 7A (Example 1). By way of example, three backscatter phasors, e.g. the first, second and third phasor 712-1, 712-2 and 713-3 shown in FIG. 7A, may mutually cancel-out at the detector 114, 116, due to destructive interference. This effect is known in the art as "signal fading". No light reaches the detector, for example the detector device 114 shown in FIG. 1, in the example shown in FIG. 7A. The reason is that at any moment the backscatter from the forward-propagating pulses 707-1, 707-2 and 707-3 at respective multiple fiber locations each has a certain amplitude and optical phase, described by a respective set of phasors 712-1, 712-2 and 712-3, as shown in Example 1. The sum 712-S of all three phasors (generally the backscatter of multiple patterns at multiple locations), for example the phasors 712-1, 712-2 and 712-3 shown in FIG. 7A, may cancel out at the detector—an effect known as "destructive interference". This leads to a fading or missing signal on the detector in the case of intensity DAS, or in the receiver interferometer arm in the case of phase DAS.

Such effect of fading can be overcome by changing the time period between consecutive coherent interrogating light patterns (i.e. the pattern period) as is proposed above in the second implementation embodiment, so that at least one of the simultaneous patterns present in the optical sensing fiber 110 comes from a different fiber location, and hence with—statistically-different phasor. The phasor sum will then have a different amplitude, especially not zero, or in other words will be less faded.

Other fading mechanisms are shown in FIG. 7B (Examples 2 and 3). The multi-pattern operation of the DAS device proposed in the second implementation embodiment may not be sensitive to an acoustic event 708 acting on the fiber 110 even if the signal is not destructively cancelled out if an acoustic event 708 impacts the backscatter phasors in a way that it does not change its amplitude (as in Example 2) and/or phase (as in Example 3). Such effects are known in the art as "sensitivity fading".

In Example 2 of FIG. 7B, the acoustic event 708 influences the pulses 707-2 and 707-3 such that the optical path length of these pulses changes. In result of this, also the phasors 714-2 and 714-3 change, such that in the phasor sum 714-S detected at the detector device 114, 116, the phase changes, but not the intensity. This is the effect of sensitivity fading in intensity detection (i.e. in intensity DAS).

In Example 3 of FIG. 7B, the acoustic event 708 influences the pulses 707-2 and 707-3 such that the optical path length of these pulses changes. In result of this, also the phasors 716-2 and 716-3 change, such that in the phasor sum 716-S detected at the receiver 114, 116, the intensity changes, but not the phase. This is the effect of sensitivity fading in phase detection (i.e. in phase DAS).

The effect of sensitivity fading can also be overcome by changing the time period between consecutive light patterns (i.e. the pattern period) in a way that at least one of the pulses that are affected by the acoustic event comes from a different fiber location (or optical path). This causes statistically different backscatter phasors (see the phasors 714-2 and 714-3 as well as the phasors 716-2 and 716-3), and thus leads to a phasor sum 714-S, 716-S that changes with the strain caused by the acoustic event 708 in a detectable way.

The phasor is quasi-randomly changing along the sensor fiber 110. By changing the light pattern period (e.g. pulse period), one can modify the set of phasors interfering at any time at the receiver (for example the detector 114, 116 shown in FIG. 1). If fading is created at a location of interest on the sensing fiber 110 with one set of phasors, there is a good probability that there will be less or even no fading with a different set of phasors. By measuring with two or more settings of the light pattern period over two or more measurement time durations (e.g. a change every second) with respectively different (or changed) time periods between the sending of the coherent interrogating light patterns (as described by way of example with reference to FIGS. 5 and 6), one can assure with a high probability that any location of interest is measuring without fading, contrary to the Examples 2 and 3 illustrated in FIG. 7B.

Finally, for an even better understanding of the present invention, reference is also made to a comparable technology of radar sensing, namely pulse-Doppler radar.

In pulse-Doppler radar detection, it is known that the radar pulse repetition frequency (PRF) must be varied in order to resolve possible ambiguity in the determination of the range, i.e. the distance to a detected object. At any moment in time during the pulse-Doppler radar measurement, several radar pulses are in the air, in particular between the radar station and a detected object, so that in in result, the apparent range of the object is a modulo function of the true range. The solution to overcome the resulting range ambiguity is to operate the radar system with two or more different PRF. Accordingly, the PRF is varied over time, as according to the present invention.

Differences between pulse-Doppler radar detection and distributed acoustic sensing (DAS) comprise the following. In DAS, measurements are performed in respect of light pulses propagating in an optical fiber, while radar pulses propagate through the air in pulse-Doppler radar. In DAS, the end of the fiber is defined, while the propagation is theoretically unlimited in pulse-Doppler radar. In DAS, the detected light signal results from Rayleigh backscatter, while the detected radiation signal is caused by reflections of radar electromagnetic radiation from the object. In DAS, there may be caused continuous backscatters from a continuum of locations, which mutually interfere, while only a single localized reflection is detected in pulse-Doppler radar. In DAS, a detected optical signal is the change (of intensity and/or phase) over time from "static" locations along the fiber or from locations moving at speeds due to acoustic excitation or from static reflectivity changes, while a detected signal results from one radar radiation pulse in pulse-Doppler radar. In DAS, data of perturbations are detected over the whole fiber length, while data are detected from localized objects (e.g. airplanes) in pulse-Doppler radar.

Supplementary, it is to be noted that "having" or "comprising" does not exclude other elements or steps, and that "a" or "an" does not exclude a plurality. In addition, it is to be noted that features or steps, which have been described above with reference to one of the above embodiment examples, may also be used in combination with other features or steps of other embodiment examples that have been described above.

LIST OF REFERENCE NUMERALS 100 distributed acoustic sensing system
101 coherent light source device
102 coherent light source
104 acousto-optical modulator
106 optical amplifier
108 circulator
110 optical sensing fiber
112 backscatter branch fiber
114 detector device
116 signal processing chain
118 evaluation device
120 control device
122 storage device
124 first optical coupler
126 outcoupling optical fiber
128 second optical coupler
130 first detection fiber
132 second detection fiber
300 interrogating light profile
302 x-axis (distance x along fiber)
304 y-axis (interrogating light intensity, I)
306 interrogating light intensity trace
307 light pulse
308 acoustic event
310 detected strain profile
312 x-axis (distance x along fiber)
314 y-axis (detected strain strength S)
316 detected strain strength trace
318 strain peak caused by acoustic event 308
400 signal diagram
402 x-axis (time t)
404 y-axis (signal strength s)
406 signal to be sampled
408 sampling points
410 reconstructed signal
500 interrogating light profile
502 x-axis (distance x along fiber)
504 y-axis (interrogating light intensity, I)
506 interrogating light intensity trace
507 light pulse
508 acoustic event
510 detected strain profile
512 x-axis (distance x along fiber)
514 y-axis (detected strain strength S)
516 detected strain strength trace
518 strain peak caused by acoustic event 508
600 interrogating light profile
602 x-axis (distance x along fiber)
604 y-axis (interrogating light intensity, I)
606 interrogating light intensity trace
607 light pulse
608 acoustic event
610 detected strain profile
612 x-axis (distance x along fiber)
614 y-axis (detected strain strength S)
616 detected strain strength trace
618 strain peak caused by acoustic event 508
700A interrogating light profile
702 x-axis (distance x along fiber)
704 y-axis (interrogating light intensity, I)
706 interrogating light intensity trace
707 light pulse
708 acoustic event
710A phasor set (Example 1)
712-1 first phasor
712-2 second phasor
712-3 third phasor
712-S sum phasor
700B interrogating light profile 710B phasor set (Example 2)
714-1 first phasor
714-2 second phasor
714-3 third phasor
714-S sum phasor
710C phasor set (Example 3)
716-1 first phasor
716-2 second phasor
716-3 third phasor
717-S sum phasor

The invention claimed is:

1. A distributed acoustic sensing method for performing using a distributed acoustic sensing (DAS) system for coupling with an optical sensing fiber, which has a selectable fiber length and a down-and-up travel time for an interrogating light pulse to travel down the fiber length and for backscattered light to travel up the fiber length, the down-and-up travel time being associated to the fiber length, wherein the distributed acoustic sensing method has the following steps:
(a) during a measurement time duration, which is equal to or greater than one times the down-and-up travel time of an optical sensing fiber, repeatedly generating with a coherent light source, and sending into the optical sensing fiber, a coherent interrogating light pattern, which is one of a plurality of coherent interrogating light patterns and composed of coherent carrier light;
(b) detecting over time with a detection device, light that is backscattered in the optical sensing fiber in response to the repeatedly sent coherent interrogating light pattern, and generating and outputting a signal indicative of detected backscattered light;
(c) analyzing the signal indicative of detected backscattered light;
wherein in step a), the coherent interrogating light pattern cannot be distinguished from another coherent interrogating pattern by comparing physical properties of the backscattered light responsive to at least two successive interrogating light patterns, and
wherein in step (a), a time period between successively sent coherent interrogating light patterns is changed over time after a passing of at least one measurement time duration,
wherein in step (a), the time period between successively sent coherent interrogating light patterns is set to a first time period during a first measurement time duration and is set to a second time period, which is different from the first time period, during a second measurement lime duration,
wherein, when performing step (a), the following operating condition is met: the time period is equal to or greater than the down-and-up travel time of the optical sensing fiber,
wherein an inverse of the first time period corresponds to a first pulse repetition frequency present during the first measurement time duration and an inverse of the second time period corresponds to a second pulse repetition frequency present during the second measurement time duration,
wherein the half of the first pulse repetition frequency $f_{pulse,\ 1}$ corresponds to a first Nyquist frequency $f_{Ny,\ 1}$ which corresponds to a largest bandwidth of an acoustic event which can be unambiguously determined when the first pulse repetition frequency $f_{pulse,\ 1}$ applies to the repeated sending of the coherent interrogating light pattern during the first measurement time duration, the first Nyquist frequency being $\frac{1}{2}f_{pulse,\ 1}$,
wherein the half of the second pulse repetition frequency $f_{pulse,\ 2}$ corresponds to a second Nyquist frequency $f_{Ny,\ 2}$, which corresponds to a largest bandwidth of an acoustic event which can be unambiguously determined when the second pulse repetition frequency $f_{pulse,\ 2}$ applies to the repeated sending of the coherent interrogating light pattern during the second measurement time duration, the second Nyquist frequency being $\frac{1}{2}f_{pulse,\ 2}$, and
wherein when performing step c), for an acoustic event having an actual frequency or bandwidth $f_{event}$ greater than the first or the second Nyquist frequency $f_{Ny}$, the actual frequency or bandwidth is mapped to an apparent frequency $f_{apparent}$ that is smaller than the first or the second Nyquist frequency $f_{Ny}$ according to:

$$f_{apparent} = abs\{(f_{event} + f_{Ny}) \bmod f_{pulse} - f_{Ny}\}$$

or $$f_{apparent} = abs\{(f_{event} + \tfrac{1}{2}f_{pulse}) \bmod f_{pulse} - \tfrac{1}{2}f_{pulse}\}$$

2. The method according to claim 1,
wherein in step (a), each coherent interrogating light pattern out of the plurality of coherent interrogating light patterns has substantially a same set of physical properties, which same set of physical properties has at least
a frequency of the carrier light,
an amplitude envelope modulation function, and
a polarization state of the carrier light.

3. The method according to claim 2,
wherein the set of physical properties excludes a mere scaling factor of the amplitude envelope modulation function.

4. The method according to claim 2,
wherein at least two coherent interrogating light patterns out of the plurality of coherent interrogating light patterns differ from each other in terms of light intensity and/or in terms of a polylevel coding sequence.

5. The method according to claim 1,
wherein the first and the second time periods are greater than the down-and-up travel time of the optical sensing fiber.

6. The method according to claim 5,
wherein the first and the second time period are less or equal than 110% of the down-and-up travel time of the optical sensing fiber.

7. The method according to claim 1, further comprising:
calculating, for an acoustic event, which is detected in measurements performed using interrogating light patterns sent during the first measurement time duration using the first pulse repetition frequency $f_{pulse,\ 1}$, and which has a detected first apparent frequency $f_{apparent,\ 1}$, a first set of possible actual frequencies $f_{event,\ 1}$ greater than the first Nyquist frequency $f_{Ny,\ 1}$,
calculating, for an acoustic event, which is detected in measurements performed using interrogating light patterns sent during the second measurement time duration using the second pulse repetition frequency $f_{pulse,\ 2}$, and which has a detected second apparent frequency $f_{apparent,\ 2}$, a second set of possible actual frequencies $f_{event,\ 2}$ greater than the second Nyquist frequency $f_{Ny,\ 2}$, and
determining, if in the first set and in the second set, there are one or more common frequency or bandwidth values, which are greater than the first and second Nyquist frequencies, respectively.

8. The method according to claim 7, further comprising:
outputting the one or more common frequency or bandwidth values as a possible actual frequency or bandwidth of an acoustic event.

9. A distributed acoustic sensing system for coupling with an optical sensing fiber, which has a selectable fiber length and a down-and-up travel time for an interrogating light to travel down the fiber length and for backscattered light to travel up the fiber length, the down-and-up travel time being associated to the fiber length, the distributed acoustic sensing system, comprising:
   a coherent light source configured to repeatedly generate and send into the optical sensing fiber during a measurement time duration, which is equal to or greater than one times the down-and-up travel time of the optical sensing fiber, a coherent interrogating light pattern, which is one of a plurality of coherent interrogating light patterns and composed of coherent carrier light;
   a detection device configured to detect over time light that is backscattered in the optical sensing fiber in response to the repeatedly sent coherent interrogating light pattern and to generate and output a signal that is indicative of the detected backscattered light;
   an evaluation device, configured to analyse the signal output from the detection device,
   wherein each coherent interrogating light pattern out of the plurality of coherent interrogating light patterns has similar physical properties, wherein coherent interrogating light patterns cannot be distinguished by comparing physical properties of the backscattered light generated from at least two successive interrogating light patterns as detected,
   wherein the coherent light source is able to change a time between successively sent coherent interrogating light patterns after the passing of at least one measurement time duration,
   wherein the coherent light source is capable to set the time period between successively sent coherent interrogating light patterns to a first time period during a first measurement time duration and to set the time period between successively sent coherent interrogating light patterns to a second time period, which is different from the first time period, during a second measurement time duration,
   wherein the coherent light source meets the following operating condition: the time period is equal to or greater than the down-and-up travel time of the optical sensing fiber,
   wherein an inverse of the first time period corresponds to a first pulse repetition frequency present during the first measurement time duration and an inverse of the second time period corresponds to a second pulse repetition frequency present during the second measurement time duration,
   wherein the half of the first pulse repetition frequency $f_{pulse,\ 1}$ corresponds to a first Nyquist frequency $f_{Ny,\ 1}$ which corresponds to a largest bandwidth of an acoustic event which can be unambiguously determined when the first pulse repetition frequency $f_{pulse,\ 1}$ applies to the repeated sending of the coherent interrogating light pattern during the first measurement time duration, the first Nyquist frequency being $\frac{1}{2}f_{pulse,\ 1}$,
   wherein the half of the second pulse repetition frequency $f_{pulse,\ 2}$ corresponds to a second Nyquist frequency $f_{Ny,\ 2}$, which corresponds to a largest bandwidth of an acoustic event which can be unambiguously determined when the second pulse repetition frequency $f_{pulse,\ 2}$ applies to the repeated sending of the coherent interrogating light pattern during the second measurement time duration, the second Nyquist frequency being $\frac{1}{2}f_{pulse,\ 2}$, and
   wherein the evaluation device is capable, for an acoustic event having an actual frequency or bandwidth $f_{event}$ greater than the first or the second Nyquist frequency $f_{Ny}$, to map the actual frequency or bandwidth to an apparent frequency $f_{apparent}$ that is smaller than the first or the second Nyquist frequency $f_{Ny}$ according to:

$$f_{apparent} = abs\{(f_{event} + f_{Ny}) \bmod f_{pulse} - f_{Ny}\}$$

or $$f_{apparent} = abs\{(f_{event} + \tfrac{1}{2}f_{pulse}) \bmod f_{pulse} - \tfrac{1}{2}f_{pulse}\}$$

10. The distributed acoustic sensing system according to claim 9,
   wherein, the evaluation device is capable to
      calculate, for an acoustic event, which is detected in measurements performed using interrogating light patterns sent during the first measurement time duration using the first pulse repetition frequency $f_{pulse,\ 1}$, and which has a detected first apparent frequency $f_{apparent,\ 1}$, a first set of possible actual frequencies $f_{event,\ 1}$ greater than the first Nyquist frequency $f_{Ny,\ 1}$,
      calculate, for an acoustic event, which is detected in measurements perforated using interrogating light patterns sent during the second measurement time duration using the second pulse repetition frequency $f_{pulse,\ 2}$, and which has a detected second apparent frequency $f_{apparent,\ 2}$, a second set of possible actual frequencies $f_{event,\ 2}$ greater than the second Nyquist frequency $f_{Ny,\ 2}$, and
      determine, if in the first set and in the second set, there are one or more common frequency or bandwidth values, which are greater than the first and second Nyquist frequencies, respectively.

11. The distributed acoustic sensing system according to claim 10,
   wherein the evaluation device is further capable to output the one or more common frequency or bandwidth values as a possible actual frequency or bandwidth of an acoustic event.

12. A computer readable storage medium storing a computer program or a computer program product that when executed on a processing: system directs the processing system to:
   (a) during a measurement time duration that is equal to or greater than a down-and-up travel time of an optical sensing fiber, repeatedly generating, with a coherent light source, a coherent interrogating light pattern being one of a plurality of coherent interrogating light patterns composed of coherent carrier light with similar physical properties;
   (b) repeatedly sending the coherent interrogating pattern into the optical sensing fiber;
   (c) detecting over time, with a detection device, light that is backscattered in the optical sensing fiber in response to the repeatedly sent coherent interrogating light patterns, and generating and outputting a signal indicative of detected backscattered light; and
   (d) analyzing the signal indicative of backscattered light;
   wherein in step a), the similar physical properties render the coherent interrogating light patterns indistinguishable based on a comparison of physical properties of the backscattered light generated from at least two successive interrogating light patterns, and wherein in step (b), a time period between successively sent coherent interrogating light patterns is changed over time after the passing of at least one measurement time duration, wherein in step (a), the time period between successively sent coherent interrogating light patterns is set to a first time period during a first measurement time duration and is set to a second time period, which is different from the first time period, during a second measurement time duration, wherein, when performing step (a), the following operating condition is met: the time period is equal to or greater than the down-and-up travel time of the optical sensing fiber, wherein an inverse of the first time period corresponds to a first pulse repetition frequency present during the first measurement time duration and an inverse of the second time period corresponds to a second pulse repetition frequency present during the second measurement time duration, wherein the half of the first pulse repetition frequency $f_{pulse, 1}$ corresponds to a first Nyquist frequency $f_{Ny, 1}$ which corresponds to a largest bandwidth of an acoustic event which can be unambiguously determined when the first pulse repetition frequency $f_{pulse, 1}$ applies to the repeated sending of the coherent interrogating light pattern during the first measurement time duration, the first Nyquist frequency being $\frac{1}{2}f_{pulse, 1}$, wherein the half of the second pulse repetition frequency $f_{pulse, 2}$ corresponds to a second Nyquist frequency $f_{Ny, 2}$, which corresponds to a largest bandwidth of an acoustic event which can be unambiguously determined when the second pulse repetition frequency $f_{pulse, 2}$ applies to the repeated sending of the coherent interrogating light pattern during the second measurement time duration, the second Nyquist frequency being $\frac{1}{2}f_{pulse, 2}$, and wherein when performing step c), for an acoustic event having an actual frequency or bandwidth $f_{event}$ greater than the first or the second Nyquist frequency $f_{Ny}$, the actual frequency or bandwidth is mapped to an apparent frequency $f_{apparent}$ that is smaller than the first or the second Nyquist frequency $f_{Ny}$ according to:

$$f_{apparent} = \text{abs}\{(f_{event}+f_{Ny}) \bmod f_{pulse} - f_{Ny}\}$$

or $$f_{apparent} = \text{abs}\{(f_{event}+\tfrac{1}{2}f_{pulse}) \bmod f_{pulse} - \tfrac{1}{2}f_{pulse}\}.$$

* * * * *